US011734758B2

(12) United States Patent
Henson et al.

(10) Patent No.: US 11,734,758 B2
(45) Date of Patent: Aug. 22, 2023

(54) TRADE AUTHORIZATION BLOCKCHAIN-BASED EXPORT AND VALUATION SYSTEM

(71) Applicant: Trade Collaboration Engine, LLC, Fort Wayne, IN (US)

(72) Inventors: Matt Henson, Fort Wayne, IN (US); David Eugene Harris, Olympia, WA (US)

(73) Assignee: TRADE COLLABORATION ENGINE, LLC, Fort Wayne, IN (US)

( * ) Notice: Subject to any disclaimer, the term of this patent is extended or adjusted under 35 U.S.C. 154(b) by 0 days.

(21) Appl. No.: 17/518,050

(22) Filed: Nov. 3, 2021

(65) Prior Publication Data

US 2022/0138849 A1 May 5, 2022

Related U.S. Application Data

(60) Provisional application No. 63/239,799, filed on Sep. 1, 2021, provisional application No. 63/109,544, filed on Nov. 4, 2020.

(51) Int. Cl.

| | |
|---|---|
| ***G06Q 40/04*** | (2012.01) |
| ***G06F 40/30*** | (2020.01) |
| ***G06F 21/10*** | (2013.01) |
| ***G06F 40/247*** | (2020.01) |

(52) U.S. Cl.
CPC ............. *G06Q 40/04* (2013.01); *G06F 21/10* (2013.01); *G06F 40/247* (2020.01); *G06F 40/30* (2020.01); *G06Q 2220/00* (2013.01)

(58) Field of Classification Search
CPC ........ G06Q 40/04; G06F 40/30; G06F 40/247
See application file for complete search history.

(56) References Cited

U.S. PATENT DOCUMENTS

| | | | | |
|---|---|---|---|---|
| 10,127,209 | B2 | 11/2018 | McCormick et al. | |
| 10,410,168 | B2 | 9/2019 | McCormick et al. | |
| 10,430,760 | B2 | 10/2019 | McCormick et al. | |
| 11,282,139 | B1 * | 3/2022 | Winkelvoss | G06Q 40/04 |
| 11,334,883 | B1 * | 5/2022 | Auerbach | G06Q 20/38 |
| 2007/0192238 | A1 | 8/2007 | Shata et al. | |
| 2014/0214695 | A1 | 7/2014 | Konchitsky | |
| 2019/0377724 | A1 | 12/2019 | Pennington et al. | |
| 2020/0159891 | A1 | 5/2020 | Patel et al. | |

(Continued)

OTHER PUBLICATIONS

Fill et al., in "Knowledge Blockchains: Applying Blockchain Technologies to Enterprise Modeling," from the 51sth Hawaii International Conference on System Science (Year: 2018).*

*Primary Examiner* — Olabode Akintola
*Assistant Examiner* — Brandon M Duck
(74) *Attorney, Agent, or Firm* — Rowan TELS LLC

(57) ABSTRACT

A system applying semantics from and applying analytics to an uploaded prior approval document to identify legal language terms affecting export approval, associating these terms with synonyms and thesaurus based comparisons and generating a control language common to prior approval agreements, thus increasing a population of trade authorizations in a blockchain and thereby enhancing an automated trade control term ontology repository. In response to a transaction of a digital asset, inter-attribute relationships are applied to evolve valuation blockchain entries for similar digital assets.

4 Claims, 16 Drawing Sheets

100

START

RECEIVE A PRIOR APPROVAL DOCUMENT 102

NORMALIZE ATTRIBUTES AND RELATIONSHIPS DEFINED IN THE PRIOR APPROVAL DOCUMENT BY MAPPING SYNONYMS COMPRISED BY THE PRIOR APPROVAL DOCUMENT TO STANDARDIZED TERMINOLOGY TO DEFINED PRIOR APPROVAL ELEMENTS 104

RESOLVE SPECIFIC ELEMENTS OF THE PRIOR APPROVAL DOCUMENT 106

ASSOCIATE INTER-ATTRIBUTE RELATIONSHIPS DEFINED WITHIN THE PRIOR APPROVAL DOCUMENT BOTH HIERARCHICALLY AND ORTHOGONALLY IN BOTH OF ONE TO ONE AND ONE TO MANY ASSOCIATIONS 108

EVOLVE A CONTROL STRUCTURE REPOSITORY FOR THE NORMALIZING, RESOLVING, AND ASSOCIATING, BASED ON THE INTER-ATTRIBUTE RELATIONSHIPS AND SYNONYMS 110

GENERATE A CONTRACT ON A BLOCKCHAIN BASED ON THE INTER-ATTRIBUTE RELATIONSHIPS 112

PROPAGATE PRIOR APPROVAL RULES FROM THE BLOCKCHAIN TO ADDITIONAL SYSTEMS 114

DONE

(56) References Cited

U.S. PATENT DOCUMENTS

| | | | | |
|---|---|---|---|---|
| 2020/0162473 | A1 | 5/2020 | Mercuri et al. | |
| 2020/0193022 | A1 | 6/2020 | Lunsford et al. | |
| 2020/0219093 | A1 | 7/2020 | Malhotra et al. | |
| 2022/0309463 | A1 * | 9/2022 | Heffron | G06Q 10/10 |

* cited by examiner

300
DDTC 302
LICENSEE 304
SUB-LICENSEE 306
REIN-IN 308
TRADE AUTHORIZATION 310
PDF 312
314
314
314
DDTC BLOCKCHAIN 316
LICENSEE BLOCKCHAIN 318
SUB-LICENSEE BLOCKCHAIN 326
320
322
322
324
322
322
324
REPORTING TOOL 328
REPORTING TOOL 328
REPORTING TOOL 328

400
TRANSACTIONAL CONTROL TRIGGER POINT 418
OBJECT ATTRIBUTES 420
ENTITY ATTRIBUTES 422
INDIVIDUAL ATTRIBUTES 424
ECI=Y/N 430
JURIS. 432
CLASS. 434
NAME 436
ADDR. 438
COUNTRY 440
EMPLR. 442
NAME 444
ADDR. 446
COUNTRY 448
126.18 450
NTNLTY. 452
426
1
2
3
428
COUNTRY 472
126.18 474
NTNLTY. 476
JURIS. 462
CLASS. 464
NAME 466
ADDR. 468
COUNTRY 470
EMPLR. 478
NAME 480
ADDR. 482
OBJECT ATTRIBUTES 454
ENTITY ATTRIBUTES 456
INDIVIDUAL ATTRIBUTES 458
TRADE AUTHORIZATION 460

TRADE AUTHORIZATION BLOCKCHAIN-BASED EXPORT AND VALUATION SYSTEM

CROSS REFERENCE TO RELATED APPLICATIONS

This application claims priority and benefit of Application Ser. No. 63/109,544, filed Nov. 4, 2020, titled "TRADE AUTHORIZATION BLOCKCHAIN EXPORT ENGINE", and Application Ser. No. 63/239,799, filed Sep. 1, 2021, titled "DIGITAL ASSET CAPITALIZATION VALUE ENABLEMENT AND QUERY", the contents of each being incorporated herein by reference in their entirety.

BACKGROUND

Governments around the world control exports of materials, hardware, software, information, and services ("regulated objects") through regulations governing exports and imports. Industry efforts to comply with these export controls are referred to as "trade compliance."

Governments authorize regulated trade through a concept commonly referred to as "prior approval." In order to achieve trade compliance, industry must ensure that transactions occur in compliance with, and are logged against, a prior approval. When operationalized, or used in business processes to approve business transactions, prior approvals serve as a company's authorization to engage in regulated trade, or "trade authorization".

Prior approval comes in the form of rules codified in the regulations (e.g., exemptions and exceptions) or through the form of export licenses (legal documents), which must be applied for by industry and approved through the government agencies having jurisdiction over the regulated objects. The prior approvals are embodied in documents produced by industry and the government agencies having jurisdiction over the regulated objects. This creates variance in how the elements in a prior approval are defined.

Prior approval structures define the elements and context (e.g. the regulated objects, including value and quantity, participating parties, statement of work, approved timeframe, and relationships between these elements) in which international trade transactions must occur to be compliant.

International trade transactions are initiated by (e.g., in the case of product shipments), or occur in (e.g., in the case of electronic access to regulated information), data networks and systems. Document-based prior approvals (e.g., those in PDF format) do not enable accurate and timely trade control decisions to be automatically performed in data networks and systems, at least because they require human review of contract terms and association of release processes in accordance with trade authorization.

Thus, industry does not have the ability to operationalize prior approvals for automated validation and record keeping of trade transactions in data networks and systems. As a result, industry struggles to comply with prior approvals controlling intangible exports such as information, intellectual property, services, and non-fungible tokens.

Intangible asset form a large component of the value of many enterprises. Intangible assets include, but are not limited to, patents, trade marks, goodwill (brand), software, design documents, and technology generally. Public companies report intangible assets on quarterly (10Q) and annual (10K) reports. They are also reported by private businesses and individuals as an asset class in financial reporting. Companies 'value' assets as application systems and generally do not include data as assets of the company. However, due to the complexity involved in tracking the effects of changes to the value of intangible assets or determining accurate value of intangible assets, many go unvalued, undervalued, or mis-valued.

With the introduction of electronic wallets and assertion of ownership of data through means such as NFT (Nonfungible Tokens), the need to generate accurate and dynamic digital asset capitalization of technology and technical data is growing.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
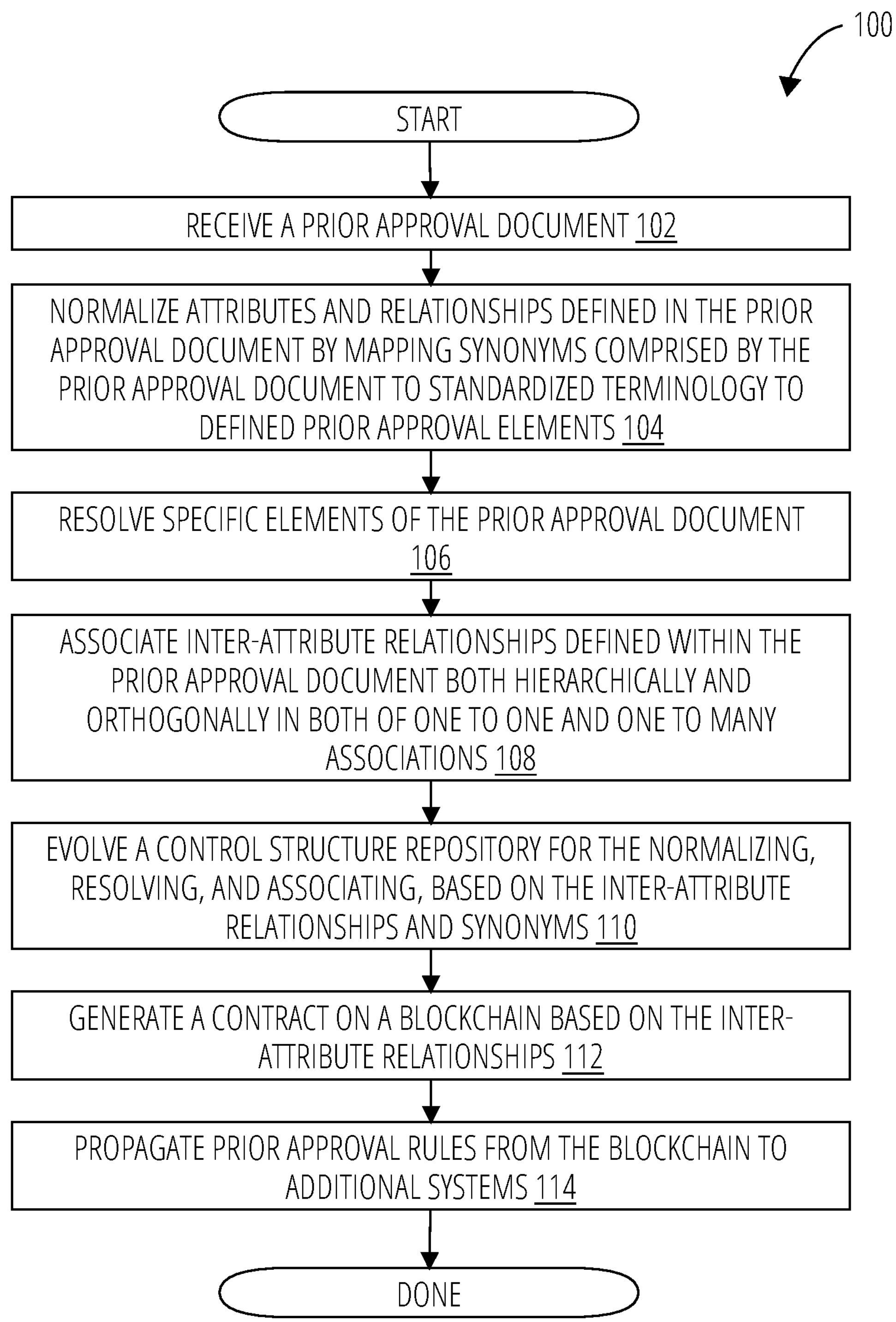
FIG. 1 depicts a routine 100 in accordance with one embodiment.

The following description may be better understood with reference to the following terminology. Other terms should be accorded their common meaning in the art unless otherwise indicated by context.

"Active contracts" (also known in the industry as "smart contracts") are logic in a blockchain that embodies transaction protocols that enable machines to enforce or execute the terms of a contract.

"Algorithm" refers to any set of instructions configured to cause a machine to carry out a particular function or process.

"Aligner" refers to logic implementing algorithm(s) to perform semantic matching between terms in documents. Semantic matching matches terms based on their contextual meaning in the documents, not necessarily or limited to literal matching. For example, an aligner may assign a greater alignment factor (contextual meaning similarity) between terms that refer to or relate similar things, persons, concepts etc. in a contexts. Any of many well-known and commercially available aligner algorithms may be utilized.

"App" refers to a type of application with limited functionality, most commonly associated with applications executed on mobile devices. Apps tend to have a more limited feature set and simpler user interface than applications as those terms are commonly understood in the art.

"Application" refers to any software that is executed on a device above a level of the operating system. An application will typically be loaded by the operating system for execution and will make function calls to the operating system for lower-level services. An application often has a user interface but this is not always the case. Therefore, the term 'application' includes background processes that execute at a higher level than the operating system.

"Application program interface" refers to instructions implementing entry points and return values to a module.

"Asset associator" refers to logic that transforms a set of aligned attributes and inter-attribute relationships for multiple assets, e.g., digital assets, into a metric of similarity between the assets. The metric of similarity may be utilized as a multiplier for applying valuation changes to one asset to the associated assets.

"Automated trade control term ontology repository" refers to logic that embodies relationships, restrictions, and rules between terms, entities, and individuals in a structured data set.

"Control term" refers to attributes of a document that act as settings to control conditions under which an asset may be moved between computer systems (in the case of digital assets) or across borders (in the case of hard assets).

"Digital asset" refers to a digital file or portion thereof that encodes something of commercial value, such as a nonfungible token (NFT) or engineering plans.

"Digital gate" refers to logic (often a combination of hardware and software) on a computer system that enables or prevents a file stored on the computer system from passing to an output port and from there over a computer network to other computer systems. Digital gates may be implemented, for example, by file read, write, copy, and communication constraints enforced by the computer's file system, by a firewall, by other well-known commercial information and network security software, and so on.

"Driver" refers to low-level logic, typically software, that controls components of a device. Drivers often control the interface between an operating system or application and input/output components or peripherals of a device, for example.

"File" refers to a unitary package for storing, retrieving, and communicating data and/or instructions. A file is distinguished from other types of packaging by having associated management metadata utilized by the operating system to identify, characterize, and access the file.

"Instructions" refers to symbols representing commands for execution by a device using a processor, microprocessor, controller, interpreter, or other programmable logic. Broadly, 'instructions' can mean source code, object code, and executable code. 'instructions' herein is also meant to include commands embodied in programmable read-only memories (EPROM) or hard coded into hardware (e.g., 'micro-code') and like implementations wherein the instructions are configured into a machine memory or other hardware component at manufacturing time of a device.

"Inter-attribute relationships" refers to the linkages between information embodied in primary and foreign keys within the data model. Examples of inter-attribute relationships include links associating employer and employee (more generally, any organization hierarchy or relationship), between employee and citizenships (generally, any hierarchy of political or geographic association), between assets and the asset's export classification, and between any person, asset, or classification and an end export authorization ID.

"Library" refers to a collection of modules organized such that the functionality of all the modules may be included for use by software using references to the library in source code.

"Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Module" refers to a computer code section having defined entry and exit points. Examples of modules are any software comprising an application program interface, drivers, libraries, functions, and subroutines.

"Plug-in" refers to software that adds features to an existing computer program without rebuilding (e.g., changing or re-compiling) the computer program. Plug-ins are commonly used for example with Internet browser applications.

"Prior approval document" refers to an electronic document defining terms and conditions for compliance with rules and regulations for the export of products, services, and/or information.

"Process" refers to software that is in the process of being executed on a device.

"Programmable device" refers to any logic (including hardware and software logic) who's operational behavior is configurable with instructions.

"Secure metalayer" refers to an encapsulation of digital information, typically using encryption, such that a key or other authorization code is needed to access the information. For example, a checksum and security element may be included in the object or document properties (metalayer). The secure metalayer enables for immutable content and properties when sharing the object or document. Only an authorized action can update the secure metalayer of the document. The secure metalayer is a control feature allowing content payload to remain encrypted and secure yet information regarding the payload to be in cleartext, yet secure.

"Service" refers to a process configurable with one or more associated policies for use of the process. Services are commonly invoked on server devices by client devices, usually over a machine communication network such as the Internet. Many instances of a service may execute as different processes, each configured with a different or the same policies, each for a different client.

"Similar digital assets" refers to digital files that satisfy a threshold of similarity digital files previously encoded on the blockchain. Examples of key or particular attributes that may be analyzed for similarity across assets are common descriptor attributes in context, i.e. similar parts, common test analysis, similar work instructions to fabrication or installation, similar components, and similar assemblies. The threshold of similarity may be satisfied in many ways, for example by a threshold of particular attributes in common, or using other metrics of similarity known in the art for comparing attribute vectors and/or files.

"Smart contract" should be accorded its ordinary meaning in the art, and generally refers to the encoding of contract terms and execution conditions for those terms on a blockchain.

"Software" refers to logic implemented as instructions for controlling a programmable device or component of a device (e.g., a programmable processor, controller). Software can be source code, object code, executable code, machine language code. Unless otherwise indicated by context, software shall be understood to mean the embodiment of said code in a machine memory or hardware component, including "firmware" and micro-code.

"Subroutine" refers to a module configured to perform one or more calculations or other processes. In some contexts the term 'subroutine' refers to a module that does not return a value to the logic that invokes it, whereas a 'function' returns a value. However herein the term 'subroutine' is used synonymously with 'function'.

"Task" refers to one or more operations that a process performs.

"Trade authorization" refers to an authorization from a regulatory authority to conduct trade in defined products, services, and/or information.

Embodiments of a system are described herein to transform elements defined in prior approvals into active contracts utilizing blockchain. The system determines control settings to act on trade authorization attributes in an automated fashion.

In one aspect, a method of operating a digital gate between computer systems includes receiving a prior approval document comprising attributes, inter-attribute relationships, and control terms for a digital asset, and normalizing the attributes, the control terms, and the inter-attribute relationships for the digital asset in the prior approval document by mapping synonyms comprised by the prior approval document to standardized terminology in a repository. The inter-attribute relationships defined within the prior approval document are associated with conditions defined by a smart contract on one or more blockchain. On condition that the conditions of the smart contract are satisfied, the digital asset is enabled to pass the digital gate.

The method may also include aligning the attributes of the digital asset to attributes of similar digital assets on the one or more blockchain, identifying inter-attribute relationships of the digital asset and similar digital assets, and applying the inter-attribute relationships, in response to a transaction of the digital asset, to evolve valuation blockchain entries for the similar digital assets.

A computing system that includes at least one processor and that also includes at least one non-transitory medium with instructions that, when applied to the at least one processor, configure the system to operate a natural language processor to identify a set of terms relevant to trade authorization in an uploaded prior approval document. The instructions further configure the system to operate machine learning logic to associate the set of terms with terms in, and identify control language common to, other prior approval documents, based on the associations and common control language. The instructions further configure the system to update an ontology structure from which a trade authorization is instantiated on a blockchain, and apply the blockchain as a control structure to limit or enable movement between computer systems of digital content identified by the uploaded prior approval document.

The system may also include instructions that configure the system to convert the trade authorization into a smart contract on a first blockchain and verify that conditions defined by settings of blocks of the smart contract are satisfied with respect to settings of blocks for a particular licensee on a second blockchain.

The system may also include instructions that configure the system to detect a change in valuation to a first asset, form an alignment of attributes of blocks for the first asset on the blockchain and attributes of blocks of a second asset on the blockchain, and, if the comparison satisfies a configured metric of similarity, apply the valuation of the first asset to determine and to record on the blockchain a valuation adjustment to the second asset.

The system may also include instructions that configure the system to recursively verify that the conditions defined by settings of blocks of the smart contract are satisfied with respect to settings of blocks for sub-licensees of the particular licensee on additional blockchains.

The system may also include instructions that configure the system to enable the movement between computer systems of the digital content from the uploaded prior approval document on condition that the conditions are satisfied.

The system may also include instructions that configure the system to inhibit the movement between computer systems of the digital content from the uploaded prior approval document on condition that the conditions are not satisfied.

The system may also include instructions that configure the system to generate a secure metalayer associating the second asset to its blockchain blocks.

In another aspect, a computer system may include a natural language processor, machine learning logic, a first blockchain, and a second blockchain. The computer system also includes a plurality of digital gates to other computer systems. The computer system includes logic to operate the natural language processor to transform an uploaded prior approval document into a set of relevant terms, operate the machine learning logic to associate the set of relevant terms with, and identify control language common to, other prior approval documents, apply the associations and common control language to generate a trade authorization on the first blockchain, and apply the first blockchain as a control structure of the second blockchain to control a movement of a digital asset between the computer system and the other computer systems.

The system may also include logic to convert the trade authorization into a smart contract on the first blockchain and verify that conditions defined by settings of blocks of the smart contract are satisfied with respect to settings of blocks for a particular licensee on the second blockchain.

The system may also include logic to detect a change in valuation to the digital asset, form an alignment of attributes of blockchain blocks of the digital asset and attributes of blockchain blocks of a different digital asset, and on condition that the alignment satisfies a threshold, apply the change in valuation of the digital asset to generate a blockchain valuation adjustment to the different digital asset.

The system may also include logic to recursively verify that the conditions defined by settings of blocks of the smart contract are satisfied with respect to settings of blocks for sub-licensees of the particular licensee on additional blockchains.

The system may also include logic to enable the movement of the digital asset on condition that the conditions defined by the settings of blocks of the smart contract are satisfied.

The system may also include logic to inhibit the movement of the digital asset on condition that the conditions defined by the settings of blocks of the smart contract are not satisfied.

The system may also include logic to generate a secure metalayer associating the different digital asset to its blockchain blocks.

Other technical features may be readily apparent to one skilled in the art from the following figures, descriptions, and claims.

Ambiguity in the trade authorization documents is resolved by the system. For example, one trade authorization document may refer to 'manufacturing a part' as an approved statement of work, while another may reference 'building a part'. The system applies semantics and analytics to analysis of legal language terms, associates these with synonyms and thesaurus based comparisons to generate a control language common to the agreements. Increasing the population of trade authorizations in the blockchain drives continual improvement of an automated trade control term ontology repository.

Users of the common automated trade control term ontology repository receive from the blockchain attributes, relationships, and trade authorization rules for active contracts, to enable the automated release for export of data and services in compliance with the originating trade authorization.

One embodiment of such a system receives a document upload that comprises a prior approval. An artificial intelligence system with active learning normalizes the elements (attributes and relationships) in the prior approval through semantic processing (i.e., the mapping of synonyms to standardized terminology defining the elements of prior approvals). Specific elements and attributes of the prior approval are resolved, and attribute relationships are defined within the prior approval. Attributes are related to one another both hierarchically as well as orthogonally. Relationships may be one to one, one to many, and many to many. As the system derives semantics over time from various approval authorities, an evolving pool of legal clauses and machine learning through natural language understanding enhances the automation provided and enhances the automated trade control term ontology repository.

Attributes of prior approvals include end use, statement of work, product types, information types, service types, and other specific attributes common to prior approvals (party, party name, party address, party role, statement of work, valid release countries, regions, treaties, recipient company and individual citizenships, dual nationals, third party nationals, end use of items, items, item type, services, service type, information type, program, relationship of contractors and sub-contractors, value, quantity, approved date, expiration date, DDTC registrant code, unit of measure, governments, jurisdictions or issuing authority (e.g., ITAR, EAR, DSGL, METI, SCOMET), classification (Trade Control Item Classification), Trade Control Item Technology reference, end use prohibitions, item prohibitions, party prohibitions, authorization type, authorization language (e.g. French, German, English, etc . . . . METI=Japanese, SCOMET=Hindu), authorized release method, port of export, named individuals, etc.)

Examples of relationship mapping between attributes include related authorizations (amendments, precedent licenses), authorization supporting documentation (addendums, exhibits), and ExAuth attribute relationships.

Derived controls may be shared among systems, enabling the discovery, control, and tracking between systems of technology and technical data licensed in trade authorizations.

The process of normalizing the terms is not typical semantic mapping. Instead of associating terms directly the system leverages repositories of terminology and associates a term with similar words in the repository. For example, certain legal terms that are going to be in the agreement may be referenced in Black's Law Dictionary and such terms may take priority in determining how the term is related in context and how it applies to a clause in the agreement. The mapping and application of terms may thus be controlled and/or prioritized based on attributes such as the presence of the term in certain source materials.

The system may identify hierarchical relationships within an agreement and modify the blockchain-hosted trade authorization according the hierarchy. For instance, an agreement might reference a registrar. The agreement might also reference a group of participant companies, each of those companies having associated statements of work. The agreement may further reference specific countries where the participant companies are allowed to work, and may reference specific products that they're allowed to work on. The system may identify the attributes of the entities, individuals, and the objects involved and utilize the information to generate blockchain-hosted pre-approval trade authorizations for use by other systems to control access or movement of certain items or information.

As the semantic ontology of relationships with term and clause language grows within the automated trade control term ontology repository, the system learns to recognize those terms and clauses with improving precision. This improved precision enables greater automation of the validation of prior approval agreements reduces the level of human interaction involved.

Embodiments of a system are described in which a sale of an intangible asset, class or group of information (technical drawing, movie file, music file, picture, report, document, testing, process, method . . . ) to another entity triggers a blockchain update process for valuation of similar assets. This is referenced in the ownership of the item and the referenced price.

In one embodiment, a system of record is updated with reference to that intangible asset, the price paid, the date of transaction, associated context of asset (related technology, object type, object reference, system reference, Intellectual Property category, rights) quantity and availability. This can be any electronic record (invoice for the technology for example) or a valuation placed within an NFT.

A machine learning system utilizing natural language processing normalizes the elements (attributes and relationships) of the asset in context to the transaction and determines if the transaction impacts the value of other digital assets. A system component referred to herein as DACBOT resolves specific elements and associates the attribute relationships defined within the asset context, aligning attributes of the transacted asset to attributes of assets based on a similarity evaluation. Thus associated, this evaluation is then aligned within a specific type of contract chain—for example chains of type ERC721 and ERC165—to reference or update the value thereof.

The GAAP (Generally Accepted Accounting Principal) utilizes the 'market value of information' such that once an asset is transacted, it has determined value, and that value, like any other business asset, is subject to GAAP operations such as, but not limited to recording the asset's value on the purchase date, determining and recording, if necessary, the fixed asset's revaluation at the end of the fiscal year, calculating and recording periodic depreciation for the fixed asset, and recording the sale of the fixed asset. When the asset is transacted, its value is adjusted for depreciation up to the date of the transaction.

In some embodiments, the system utilizes a process to functionally associate relationships between assets to one another orthogonally. Contracts and licenses may be digitally scanned, and intangible assets with transaction data computed at time of release. Business contracts and other material information such as invoices, master agreements, trade control licenses . . . may maintain in one form or another a 'sale' or 'paid transfer' of technology, technical data, marketing data, personal data, and health data, for example. The system's accuracy and efficiency in identifying asset attributes, relationships, and similarities improves through machine learning as more digital assets are processed through the system.

In some embodiments, the DACBOT comprises three main components:

An analytics interface for ingested business contracts and other material information to derive specific data-sets and ultimately atomic valuation of similar individual digital assets in scope to the release value to the customer;

Attributes derived from a TABEE system utilized to associate similar digital assets and to enable the automated capitalization of them via scanning and alignment;

a blockchain maintaining asset valuations by digital asset type which is continually updated as digital assets in context are discovered and re-valued within the extended ecosystem of the user.

The system enables organizations to identify, apply, and update value assigned to digital assets shared internally or externally, prioritize the information with enhance security controls, insure the information, quantify how much value is shared within the supply chain or with customers, and to apply asset sharing policies. One benefit that accrues from the system to organizations is more accurate and up-to-date procurement and management of cyberinsurance. Users may more readily identify indemnification risk in ongoing concern agreements by policy or rule within contract lifecycle management systems or within legal contract risk analysis. This alignment of 'value' of asset in scope to cyber-insurance drives GAAP compliance and accounting rigor through enablement of, and compliance to, other standards, such as found in NFT solutions.

The DACBOT may utilize a crawler, search engine, file systems, etc. To scan local machines, servers, shares, sharepoints, CSP (Cloud Service Providers), hyperconverged virtual ecosystems, and virtual machines to identify sources of assets and attributes and/or in performing operations such as alignment and association. Utilizing such components, DACBOT may scan third party information providers such as auction sites, the Dark Web, and other areas to identify, track and value exfiltrated intellectual property and quantify any loss to the user organization.

A value identifier may be securely embedded into the blockchain for asset types. A secure layer of META information may also be added to the digital asset itself. This connection to the blockchain within the digital asset completes this connection for value association regardless of whether the digital asset is tethered to the user's machines in some form, or untethered from it, as the blockchain reference is maintained in the asset itself within a secure, but highly available META layer.

In some embodiments, the DACBOT functions both with structured and unstructured digital assets. The META layer connection to the blockchain, maintained by the DACBOT, may be implemented at the row level in a structured database as a component of a larger ecosystem data model as well as direct META enablement of unstructured information through secure packaging that provides clear-text systematic availability.

Additionally, embodiments of a system (TABEE) are described herein to transform elements defined in prior approvals into active contracts utilizing blockchain. "Active contracts" (also known in the industry as "smart contracts") are logic in a blockchain that embodies transaction protocols that enable machines to enforce or execute the terms of a contract. The system determines control settings to act on trade authorization attributes in an automated fashion.

Ambiguity in the trade authorization documents is resolved by the system. For example, one trade authorization document may refer to 'manufacturing a part' as an approved statement of work, while another may reference 'building a part'. The system applies semantics and analytics to analysis of legal language terms, associates these with synonyms and thesaurus based comparisons to generate a control language common to the agreements. Increasing the population of trade authorizations in the blockchain drives continual improvement of an automated trade control term ontology repository.

Users of the common automated trade control term ontology repository receive from the blockchain attributes, relationships, and trade authorization rules for active contracts, to enable the automated release for export of data and services in compliance with the originating trade authorization.

One embodiment of such a system receives a document upload that comprises a prior approval. An artificial intelligence system with active learning normalizes the elements (attributes and relationships) in the prior approval through semantic processing (i.e., the mapping of synonyms to standardized terminology defining the elements of prior approvals). Specific elements and attributes of the prior approval are resolved, and attribute relationships are defined within the prior approval. Attributes are related to one another both hierarchically as well as orthogonally. Relationships may be one to one, one to many, and many to many. As the system derives semantics over time from various approval authorities, an evolving pool of legal clauses and machine learning through natural language understanding enhances the automation provided and enhances the automated trade control term ontology repository.

Attributes of prior approvals include end use, statement of work, product types, information types, service types, and other specific attributes common to prior approvals (party, party name, party address, party role, statement of work, valid release countries, regions, treaties, recipient company and individual citizenships, dual nationals, third party nationals, end use of items, items, item type, services, service type, information type, program, relationship of contractors and sub-contractors, value, quantity, approved date, expiration date, DDTC registrant code, unit of measure, governments, jurisdictions or issuing authority (e.g., ITAR, EAR, DSGL, METI, SCOMET), classification (Trade Control Item Classification), Trade Control Item Technology reference, end use prohibitions, item prohibitions, party prohibitions, authorization type, authorization language (e.g. French, German, English, etc . . . . METI=Japanese, SCOMET=Hindu), authorized release method, port of export, named individuals, etc.)

Examples of relationship mapping between attributes include related authorizations (amendments, precedent licenses), authorization supporting documentation (addendums, exhibits), and ExAuth attribute relationships.

Derived controls may be shared among systems, enabling the discovery, control, and tracking between systems of technology and technical data licensed in trade authorizations.

The process of normalizing the terms is not typical semantic mapping. Instead of associating terms directly the system leverages repositories of terminology and associates a term with similar words in the repository. For example, certain legal terms that are going to be in the agreement may be referenced in Black's Law Dictionary and such terms may take priority in determining how the term is related in context and how it applies to a clause in the agreement. The mapping and application of terms may thus be controlled and/or prioritized based on attributes such as the presence of the term in certain source materials.

The system may identify hierarchical relationships within an agreement and modify the blockchain-hosted trade authorization according the hierarchy. For instance, an agreement might reference a registrar. The agreement might also reference a group of participant companies, each of those companies having associated statements of work. The agreement may further reference specific countries where the participant companies are allowed to work, and may reference specific products that they're allowed to work on. The system may identify the attributes of the entities, individuals, and the objects involved and utilize the information to generate blockchain-hosted pre-approval trade authorizations for use by other systems to control access or movement of certain items or information.

As the semantic ontology of relationships with term and clause language grows within the automated trade control term ontology repository, the system learns to recognize those terms and clauses with improving precision. This improved precision enables greater automation of the validation of prior approval agreements reduces the level of human interaction involved.

An improvement in communication bandwidth may be achieved due to a reduction in the number of signals exchanged between disparate computer systems operated by different entities, as compared with conventional systems. Once the prior approval document is loaded, the signaling to determine operation of the digital gate may be constrained to one or a group of systems (e.g., within a secure data center) that have access to the blockchains and one or a group of users authorized by the prior approval to access specified data. The improvement in bandwidth may lead to fewer system operational latencies (shorter signaling paths) and thus improved performance and enhanced data security and trade compliance.

By leveraging semantic similarity to, common inter-attribute relationships with, and common control language with a corpus of previously analyzed prior approval documents and/or digital assets, the system reduces the number and length of delay points between input of a prior approval document and/or asset transaction and operation (or inhibition) of the digital gate for movement of the asset (or an export approval or certificate of ownership for the asset) to another computer system. The result in greater operational efficiencies such as reduced latency and/or propagation delays between the computer systems.

The system is operationally more robust than conventional systems due to having a reduced (or eliminated) number of branch points (or decision points). The prior approval document or asset transaction need not be communicated multiple times between multiple computer and storage systems, with decision points at each step, as in prior approaches. The reduced branching (or decision) complexity may improve system performance and/or reliability, and may reduce the possibility of stalling at a particular stage or system. Another advantage of this is reduction or elimination of bottlenecks in determination of the digital gate control for moving a digital asset.

FIG. 1 depicts a routine 100 in one embodiment. In block 102, routine 100 receives a prior approval document or documents. In block 104, routine 100 normalizes attributes and relationships defined in the prior approval document(s) by mapping synonyms comprised by the prior approval document(s) to standardized terminology to defined prior approval elements. In block 106, routine 100 resolves specific elements of the prior approval document(s). In block 108, routine 100 associates inter-attribute relationships defined within the prior approval document both hierarchically and orthogonally in both of one to one, one to many, and many to many associations. In block 110, routine 100 evolves a control structure repository (e.g., the automated trade control term ontology repository) for the normalizing, resolving, and associating, based on the inter-attribute relationships and synonyms. In block 112, routine 100 generates a contract (such as a trade authorization agreement) on a blockchain based on the inter-attribute relationships. In block 114, routine 100 distributes rules embodied in the contract to a plurality of distributed computer systems for further actions such as access and movement control to products, services, or information defined in the blockchain contract.

Figure 2:
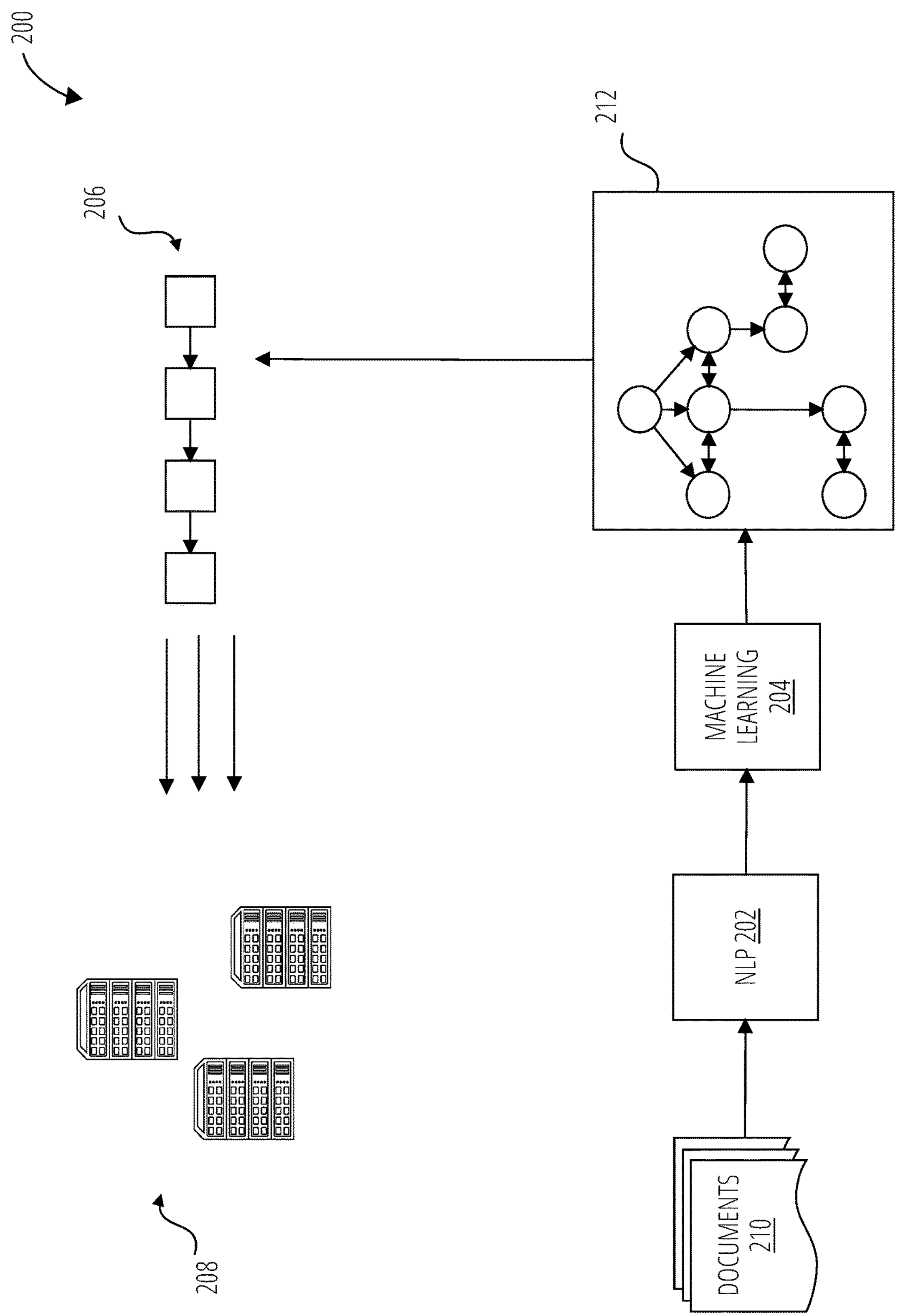
FIG. 2 depicts a system 200 in accordance with one embodiment.

FIG. 2 depicts a system 200 in one embodiment. The system 200 comprises a natural language processor 202, machine learning logic 204, a blockchain 206, and distributed computer systems 208. The natural language processor 202 should be understood to encompass "Natural Language Understanding" (NLU) as well.

The system 200 comprises logic to apply semantics and analytics from an uploaded prior approval document (documents 210) to identify relevant terms through operation of a natural language processor 202. The system 200 comprise logic to associate these terms and to identify control language common to prior approval agreements through operation of the machine learning logic 204. The system 200 comprises logic to update an ontology structure 212 from which a trade authorization is instantiated on a blockchain 206. The trade authorization instantiated on the blockchain 206 may operate to control access to and/or movement authorization of products, services, and information by and and between distributed computer systems 208.

Figure 3:
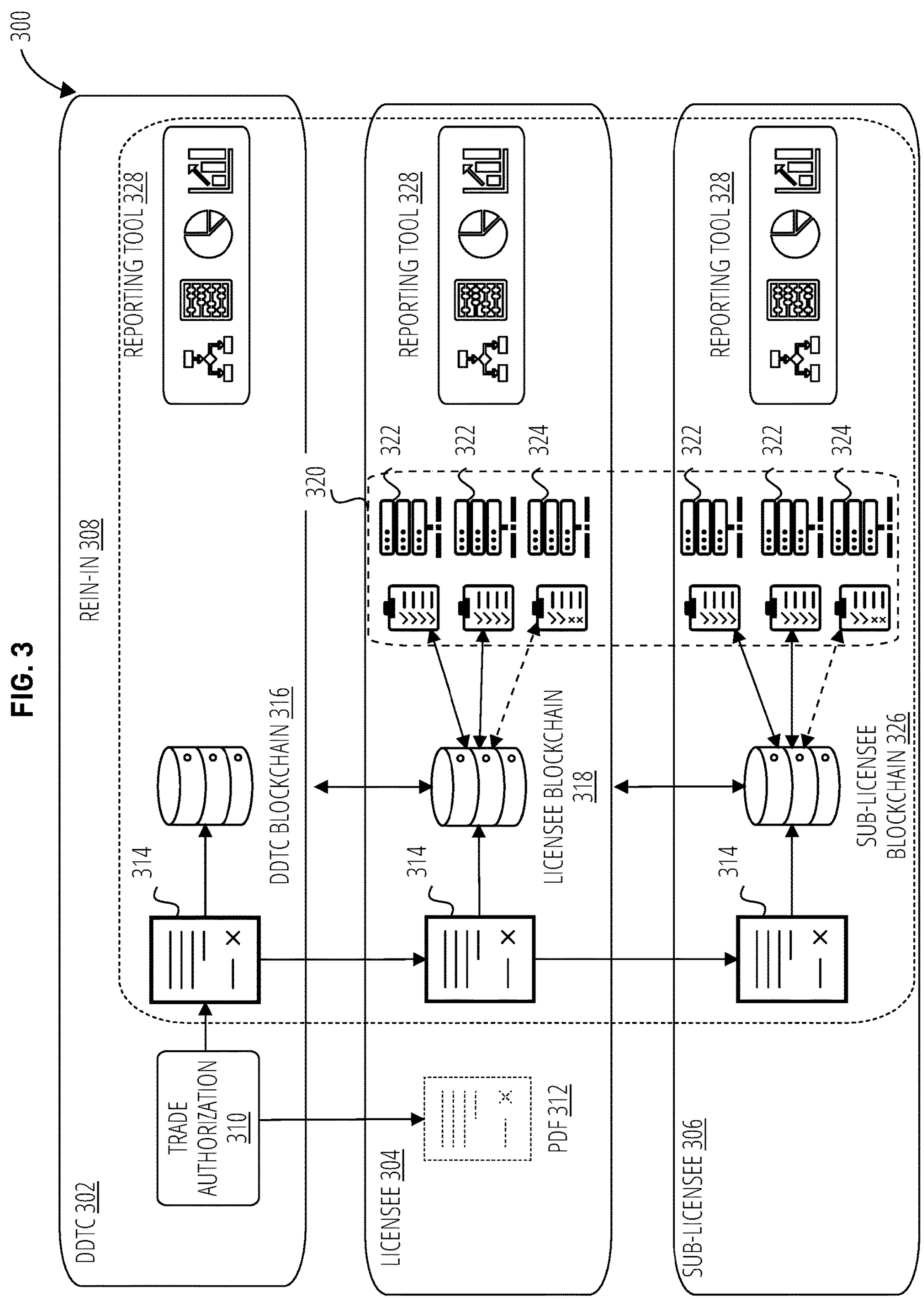
FIG. 3 depicts a system 300 in accordance with one embodiment.

FIG. 3 depicts a system 300 in one embodiment. The system 300 comprises a directorate of defense trade control entity (DDTC 302), a licensee entity (licensee 304), a sub-licensee entity (sub-licensee 306), and a the Real-time Export Intelligence Network & Incident Notification system (REIN-IN 308). Traditionally, the DDTC 302 issues a Trade Authorization 310 in the form of an electronic document (e.g., PDF 312) that is communicated to the licensee 304, which is utilized to authorize exports which may be handled by a sub-licensee 306.

In the system 300, REIN-IN 308 converts the Trade Authorization 310 from the DDTC 302 into a smart contract 314 to be utilized as a hyper ledger (DDTC blockchain 316). The smart contract 314 is communicated to the licensee 304 where the licensee blockchain 318 of the licensee 304 communicates with the DDTC blockchain 316 of the DDTC 302. The licensee blockchain 318 communicates with nodes 320 that verify that the conditions of the smart contract 314 are met for approving the particular licensee 304. For example, the licensee blockchain 318 communicates with node 322 which verify that the conditions of the smart contract 314 are met, however the node 324 communicates that the conditions of the smart contract 314 are not met. The verification process carries on to sub-licensee 306 where the sub-licensee blockchain 326 of the sub-licensee 306 communicates with the licensee blockchain 318 of the licensee 304 and also verifies the information with the nodes 320 before authorization. The REIN-IN 308 displays information through a reporting tool 328 that displays and tracks the authorizations through out the supply chain. The reporting tool 328 may be utilized for authorization attribute pattern identification (by authorization type) and attribute mapping.

Figure 4A:
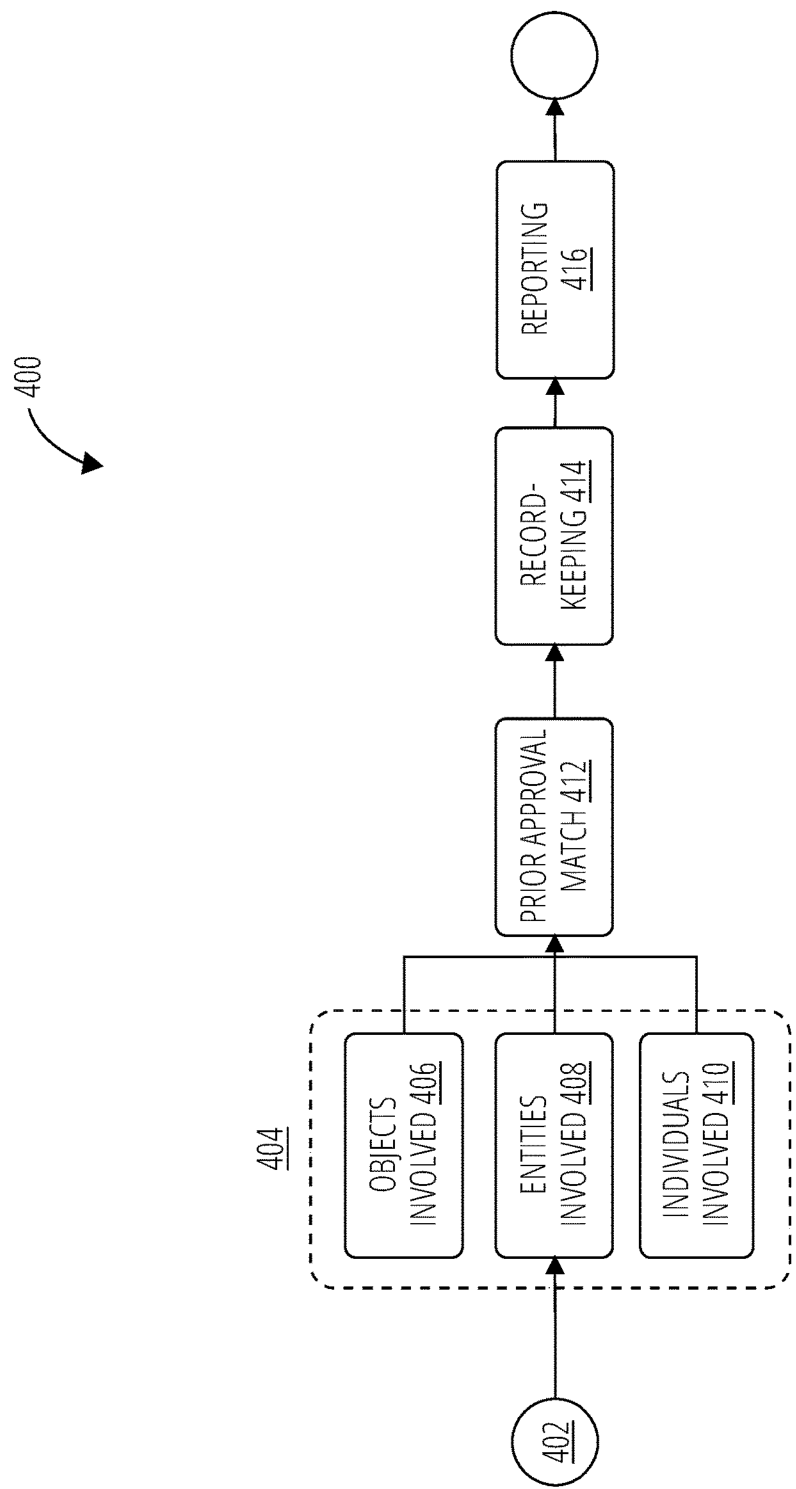
FIG. 4A depicts a prior approval matching process 400 in accordance with one embodiment.
Figure 4B:
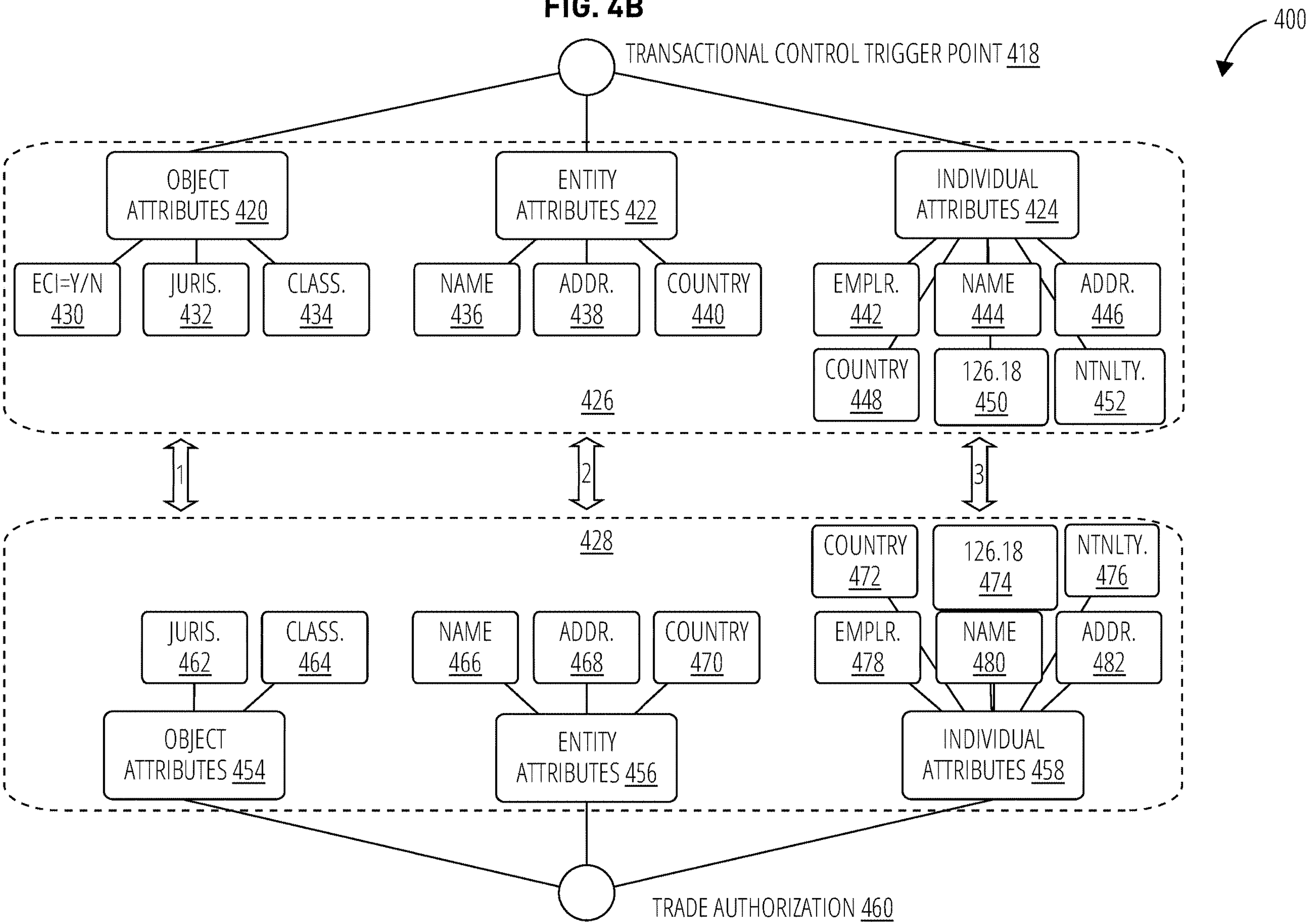
FIG. 4B depicts additional aspects of the prior approval matching process 400 in accordance with one embodiment.

FIG. 4A and FIG. 4B depict a prior approval matching process 400 in one embodiment. Export control regimes typically utilize prior approvals to control the export of sensitive products, services, and information. Thus, by default, if prior approval does not exist, a transaction is blocked until prior approval is obtained. To determine if a transaction is subject to export controls, the transaction must be evaluated against export control requirements. Thus, many transactions are subject to some form of prior approval analysis, but not all require prior approval and trade authorization restrictions.

There are two ways in which regulatory regimes implement the prior authorization concept: (1) specific prior approvals are defined in the regulations in what are commonly referred to as "exemptions" and "exceptions." When a transaction satisfies the conditions defined in a regulatory exemption or exception, the exemption or exception serves as the prior authorization and the transaction is permissible under the regulation. Where a transaction does not satisfy the conditions of an exemption or exception, regulatory regimes require (2) companies to explicitly request regulatory approval via an export license (DSP-5s, TAAs, etc.). If the regulators grant the license request, the approved export license serves as prior authorization. Any exports that occur in the absence of prior authorization do so illegally, and represent violations of export control regulations.

In summary, the fundamental objective of prior approval regimes is to prevent unauthorized exports while enabling authorized exports. The prior approval matching process 400 enables business transactions while reducing downtime and overhead for processing export approvals. It enhances compliant international trade while reducing export compliance risks.

In FIG. 4A, when a business transaction 402 begins, transaction attributes 404 are determined that define the objects involved 406, the entities involved 408, and the individuals involved 410 (including organizations). These transaction attributes 404 are analyzed to determine if there is a prior approval match 412. After determining a prior approval match 412, record-keeping 414 and reporting 416 are applied.

In FIG. 4B, a transactional control trigger point 418 is configured in the system where the object attributes 420, entity attributes 422, and individual attributes 424 are received. These transactional attributes 426 which are analyzed against automated trade control term ontology repository 428. In this example the object attributes 420 comprise an ECI=Y/N 430 attribute, a jurisdiction 432 attribute, and a classification 434 attribute for the object. Other attributes may be leveraged as well, a non-limiting example being "data type", e.g., CAD file, 2D drawing, manufacturing work instruction, acceptance test plan, failure analysis . . . ].

The ECI=Y/N attribute is a binary attribute identifying if the object is export controlled information (ECI). The entity attributes 422 comprises a name 436 attribute, an address 438 attribute, and a country 440 attribute for the entity. The individual attributes 424 comprise an employer 442 attribute, a name 444 attribute, an address 446 attribute, a country 448 (e.g., residency) attribute, a 126.18 attributes 450, and a nationality 452 attribute of the individual. Another entity and/or individual attribute that may be utilized is Restricted Party Screening (RPS) status of the entities and individuals. Restricted Parties Screening is the process by which industry ensures business is not conducted with entities or individuals who are sanctioned, embargoed, denied, debarred, or otherwise restricted from participating. These values are compared to the object attributes 454, the entity attributes 456, and the individual attributes 458 stored in the automated trade control term ontology repository 428 to determine a trade authorization 460. In this example the stored object attributes 454 comprise the jurisdiction 462 attributes and the classification 464 attributes of objects identified in previously analyzed prior approvals. The entity attributes 456 comprise the name 466 attributes, the address 468 attribute, and the country 470 attributes of entities identified in previously analyzed prior approvals. The individual attributes 458 comprise the country 472 attributes, the 126.18 attributes 474 (e.g., for ITAR), the nationality 476 attribute, the employer 478 attributes, the name 480 attributes, and the address 482 attributes of individuals identified in previously analyzed prior approvals.

FIG. 5A-FIG. 5F depict an ECI lifecycle management process 500 in one embodiment. In the ECI lifecycle management process 500, ECI is received (receiving block 502) from customers 504 and the suppliers 506 of products, services, or information. Additionally, information may be created (creation block 508) by the recipient, to include ECI derived from ECI provided by customers 504 and suppliers 506. ECI received (receiving block 502) and created (creation block 508) are stored (storage block 510). The stored ECI is managed (management block 512) and utilized for collaboration (collaboration block 514). The ECI may then be transmitted (transmission block 516) to other customers 518 and other suppliers 520. The ECI may also be backed up and archived (back-up/archival block 522) for later use.

References to "exports" may be understood to mean movement of assets, either physical or digital, across political (and hence, physically geographical) borders. In the case of digital assets specifically, "export" refers to movement of the digital asset through a digital gate between computer systems, typically also across political borders.

Figure 5A:
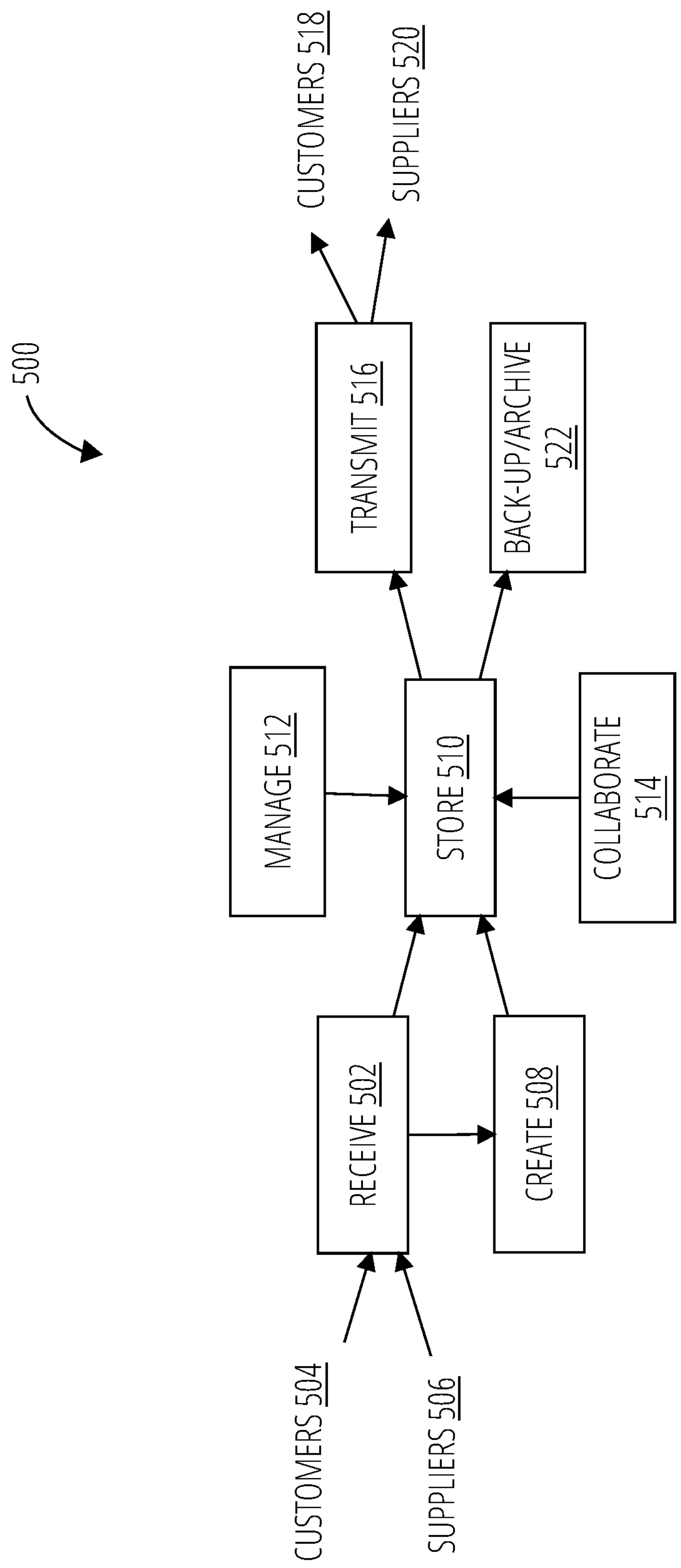
FIG. 5A depicts an ECI lifecycle management process 500 in accordance with one embodiment.
Figure 5B:
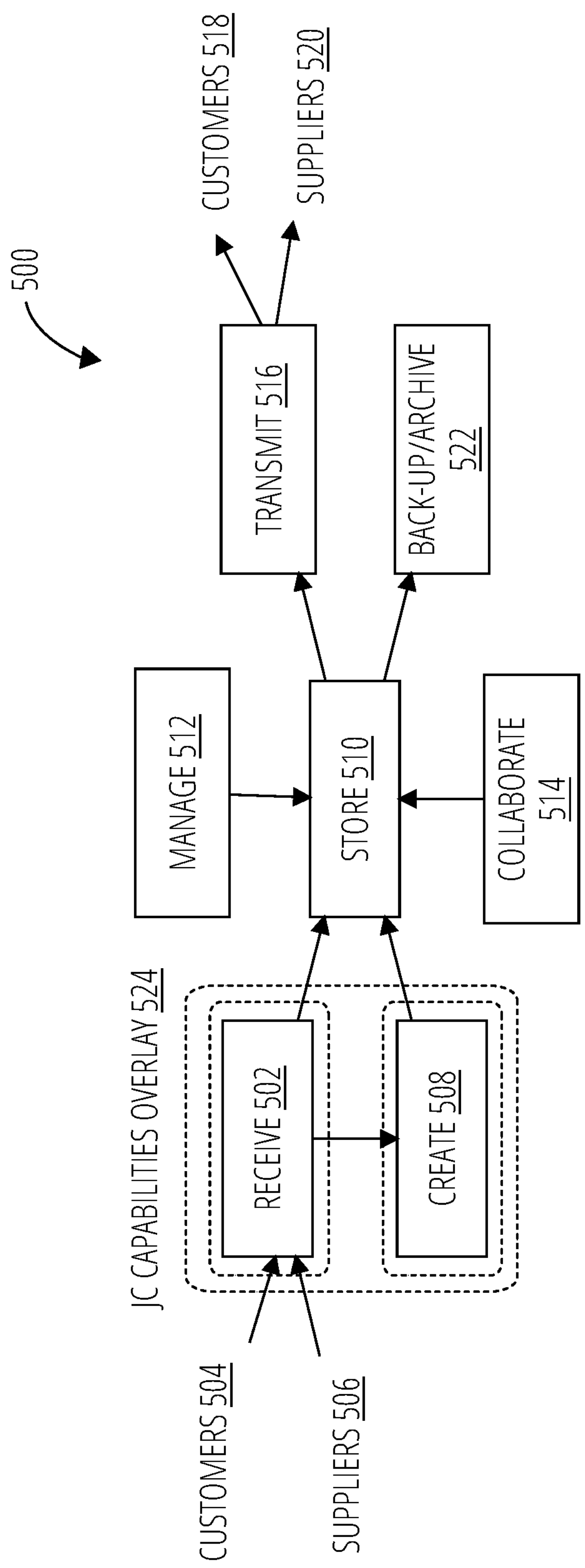
FIG. 5B depicts additional aspects of the ECI lifecycle management process 500 in accordance with one embodiment.

In FIG. 5B, a JC capabilities overlay 524 must be applied to the ECI at the receiving block 502 and creation block 508 so the ECI may be identified and properly stored (storage block 510).

Figure 5C:
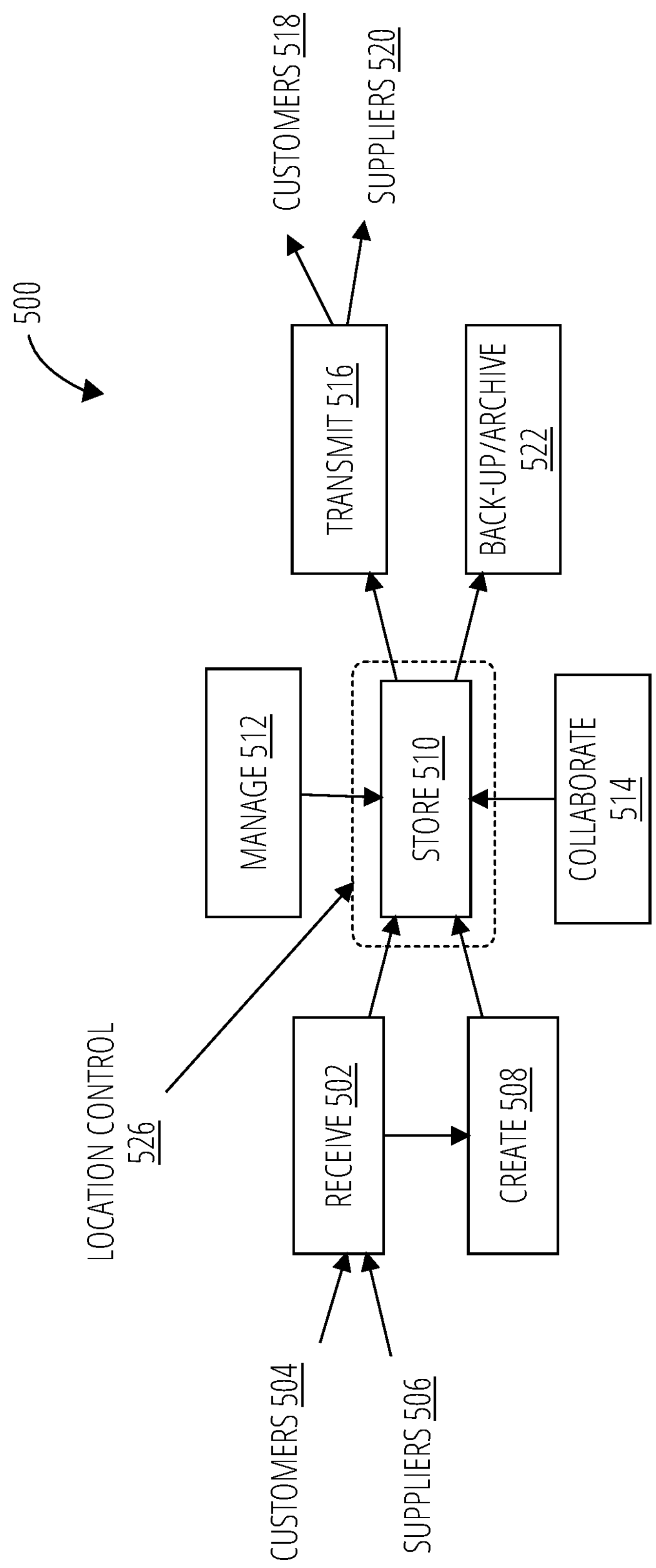
FIG. 5C depicts additional aspects of the ECI lifecycle management process 500 in accordance with one embodiment.

In FIG. 5C, a location control 526 is applied to the storage block 510 to control unauthorized exports and/or enable authorized exports by way of access to products, services, or information defined in the storage block 510.

Figure 5D:
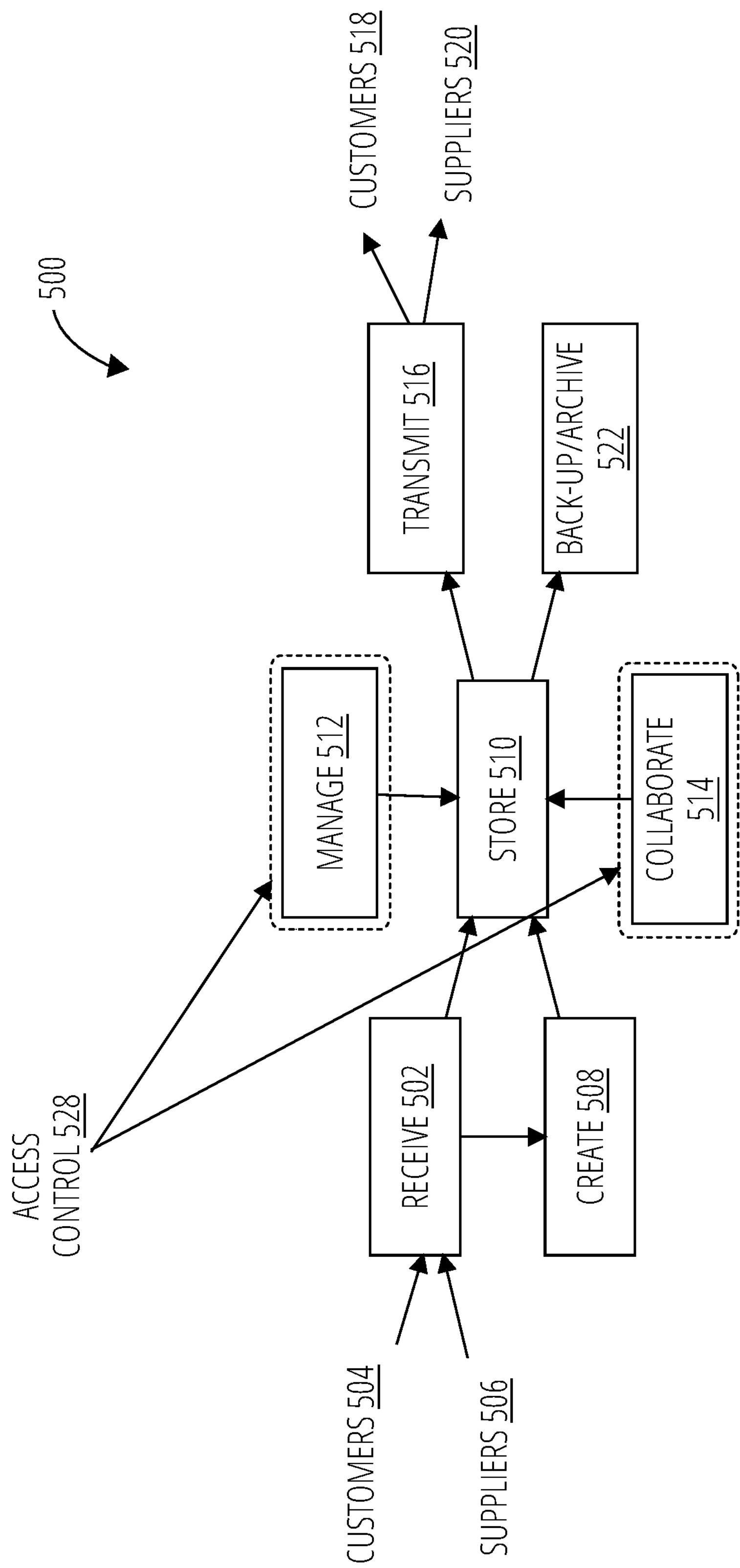
FIG. 5D depicts additional aspects of the ECI lifecycle management process 500 in accordance with one embodiment.

In FIG. 5D, an access control 528 is applied to the management block 512 and collaboration block 514. The access control 528 is operable to prevent unauthorized exports and/or enable authorized exports, and/or controlling access to information in the storage block 510.

Figure 5E:
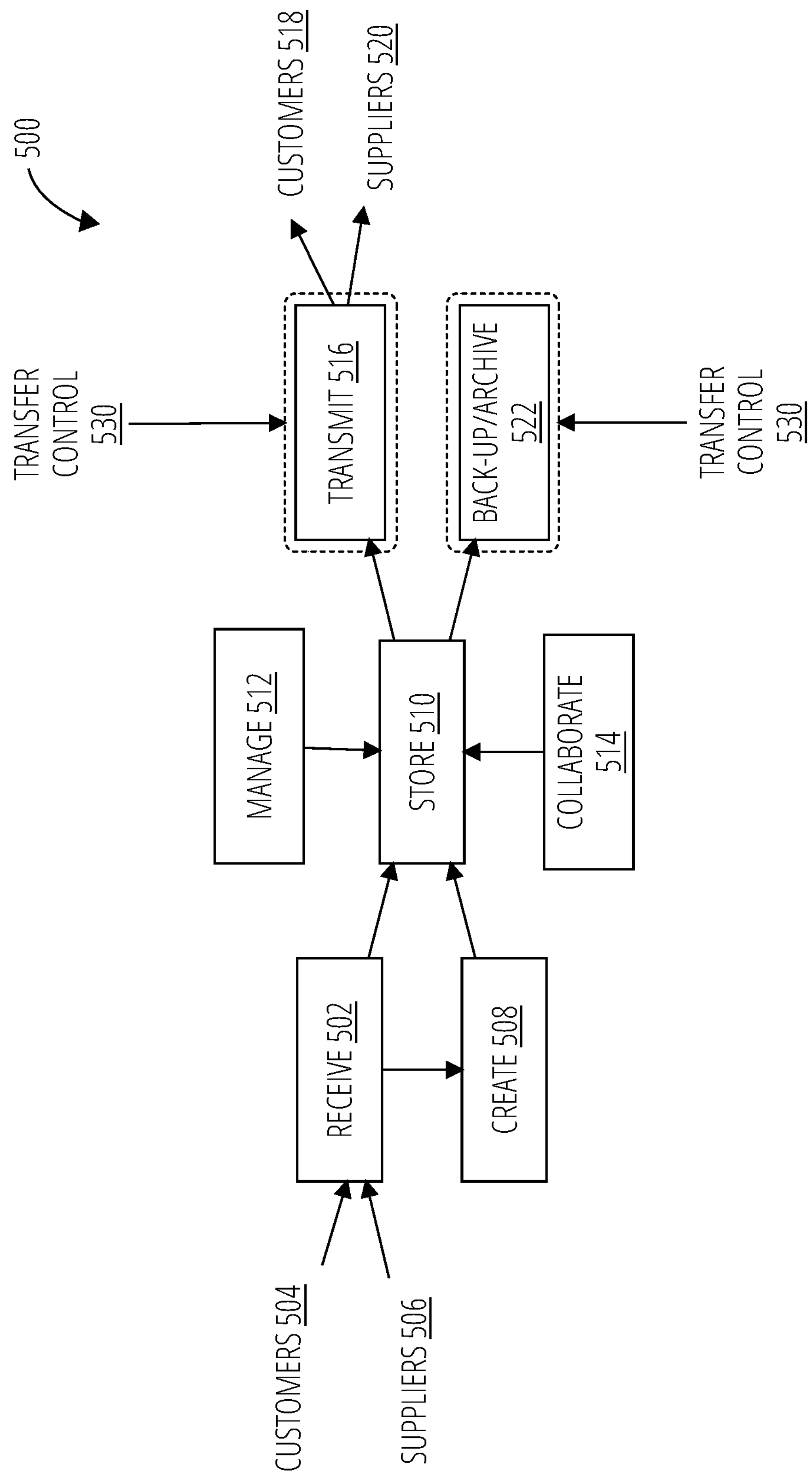
FIG. 5E depicts additional aspects of the ECI lifecycle management process 500 in accordance with one embodiment.

In FIG. 5E, a transfer control 530 is applied to the transmission block 516 and the back-up/archival block 522. The transfer control 530 is operable to prevent unauthorized exports and/or enable authorized exports, and/or controlling transfer of information in the storage block 510.

Figure 5F:
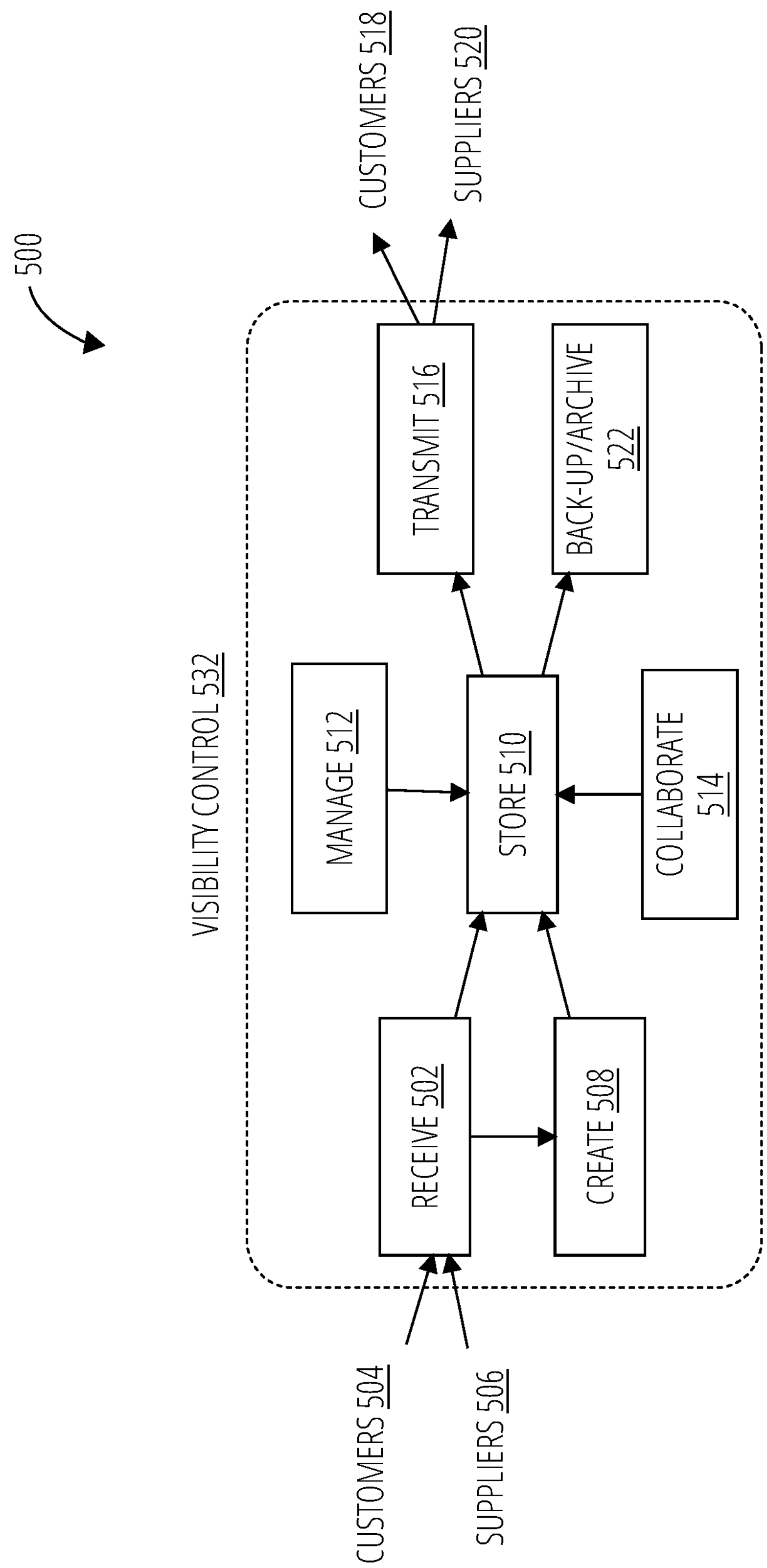
FIG. 5F depicts additional aspects of the ECI lifecycle management process 500 in accordance with one embodiment.

In FIG. 5F, a visibility control 532 is applied to the receiving block 502, the creation block 508, the storage block 510, the management block 512, the collaboration block 514, the transmission block 516, and the back-up/archival block 522. The visibility control 532 provides visibility into what data is ECI, where it is located, who has access/is accessing, to whom it is being transferred, and under what authorizations.

Figure 6:
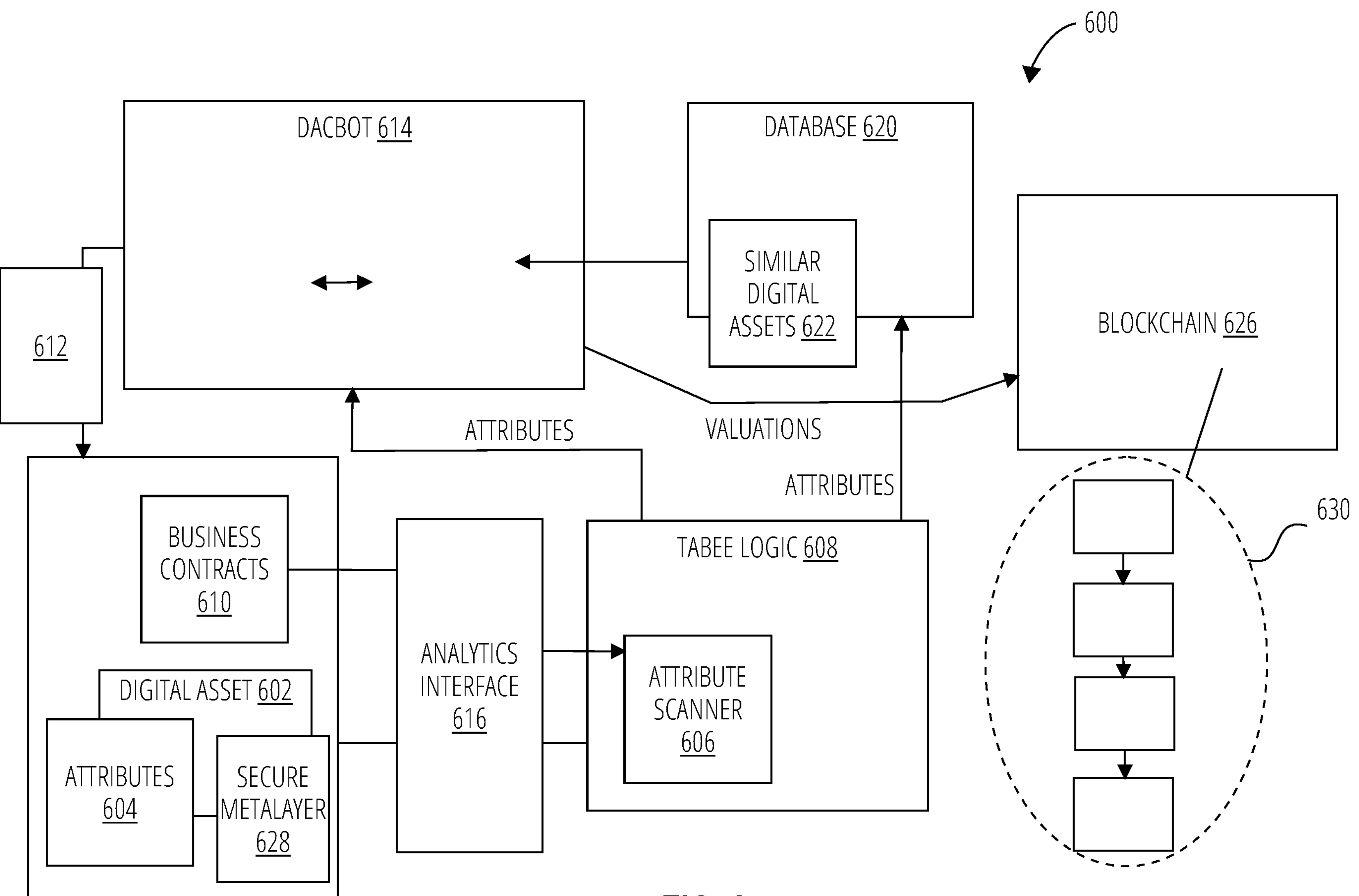
FIG. 6 depicts a DACBOT system 600 in accordance with one embodiment.

FIG. 6 depicts a DACBOT system 600 (Digital Asset Capitalization Robotics) in one embodiment.

A digital asset 602 undergoes a change in valuation. The change in valuation may be triggered in a number of ways, for example through monetizing the asset in a sale or license, or through a valuation change triggered by a valuation change in a different asset. The digital asset 602 has associated attributes 604 that may be curated using a human expert to identify and tag the digital asset 602 with the attributes 604, or via machine learning such as supervised, unsupervised, or semi-supervised learning. The attributes 604 may for example be curated by applying an attribute scanner 606 of TABEE logic 608 (Trade Authorization Blockchain Export Engine) to business contracts 610 or other documents associated with the digital asset 602. These documents may be curated from disparate computer systems utilizing a computer system crawler 612 operated by the DACBOT 614. The change in valuation may be applied via an analytics interface 616 to activate a DACBOT 614 comprising an asset associator 618 that operates on a database 620 to identify similar digital assets 622. Outputs of the asset associator 618 may include similar digital assets 622 identified via an attribute aligner 624, and valuation adjustments for the similar digital assets 622 affected by the change in valuation to the digital asset 602. The valuation adjustments for the similar digital assets 622 may be recorded on a blockchain 626 record, and a secure metalayer 628 associating the asset to its blockchain 626 record(s) may be added to the digital asset 602.

A Distinguishable Assets Registry (DAR for short) is a contract that tracks ownership of, and information about, a set of assets (e.g., NFTs) that are distinguishable from each other. Such contracts may be implemented as chains on the blockchain 626 embodying ERC 165 smart contracts. ERC165 is a conventional mechanism to publish and detect what interfaces a smart contract implements. ERC-721 is mechanism for implementing NFTs on the Ethereum blockchain. In some embodiments, NFT-related contracts may be implemented as ERC721/ERC821 chains 630 on the blockchain 626. See for example https://github.com/decentraland/erc821 for a reference implementation.

Figure 7:
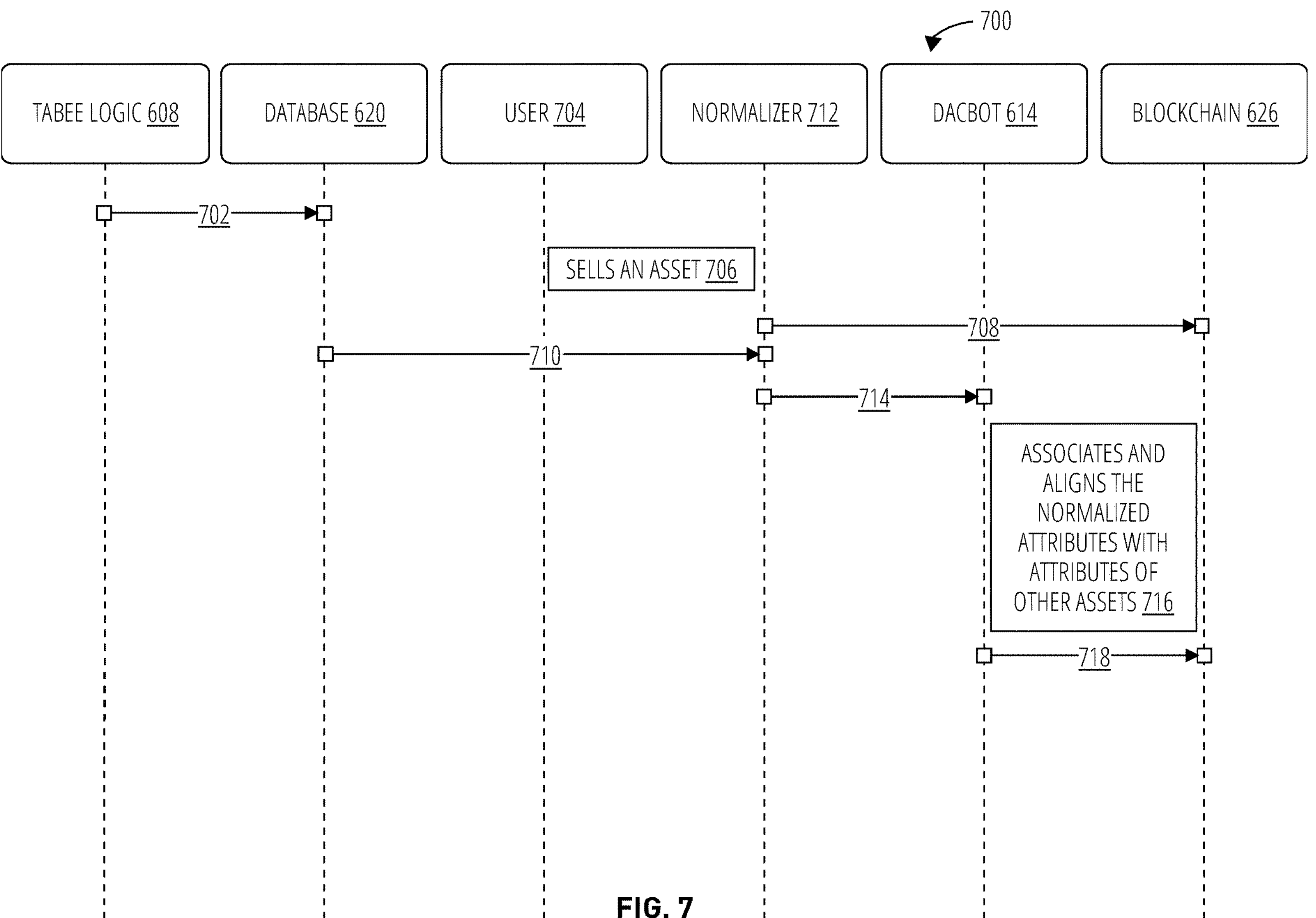
FIG. 7 depicts a blockchain asset re-valuation process 700 in accordance with one embodiment.

FIG. 7 depicts a blockchain asset re-valuation process 700 in one embodiment. Asset attributes 702 are communicated from TABEE logic 608 to a database. The database 620 serves as a repository of asset attributes that may be accessed by a user 704 or other component as a result of an asset transaction. The asset transaction (a sale, license, or other monetization or valuation assignment to the asset). The user 704 sells an asset 706 which generates a sales record 708 on the blockchain 626. Asset attributes and relationships 710 are provided from the database 620 to a normalizer 712 that generates normalized attributes 714 and provides them to the DACBOT 614. The DACBOT 614 associates and aligns the normalized attributes with attributes of other assets 716 and generates value adjustments to similar assets 718 on the blockchain 626.

Figure 8:
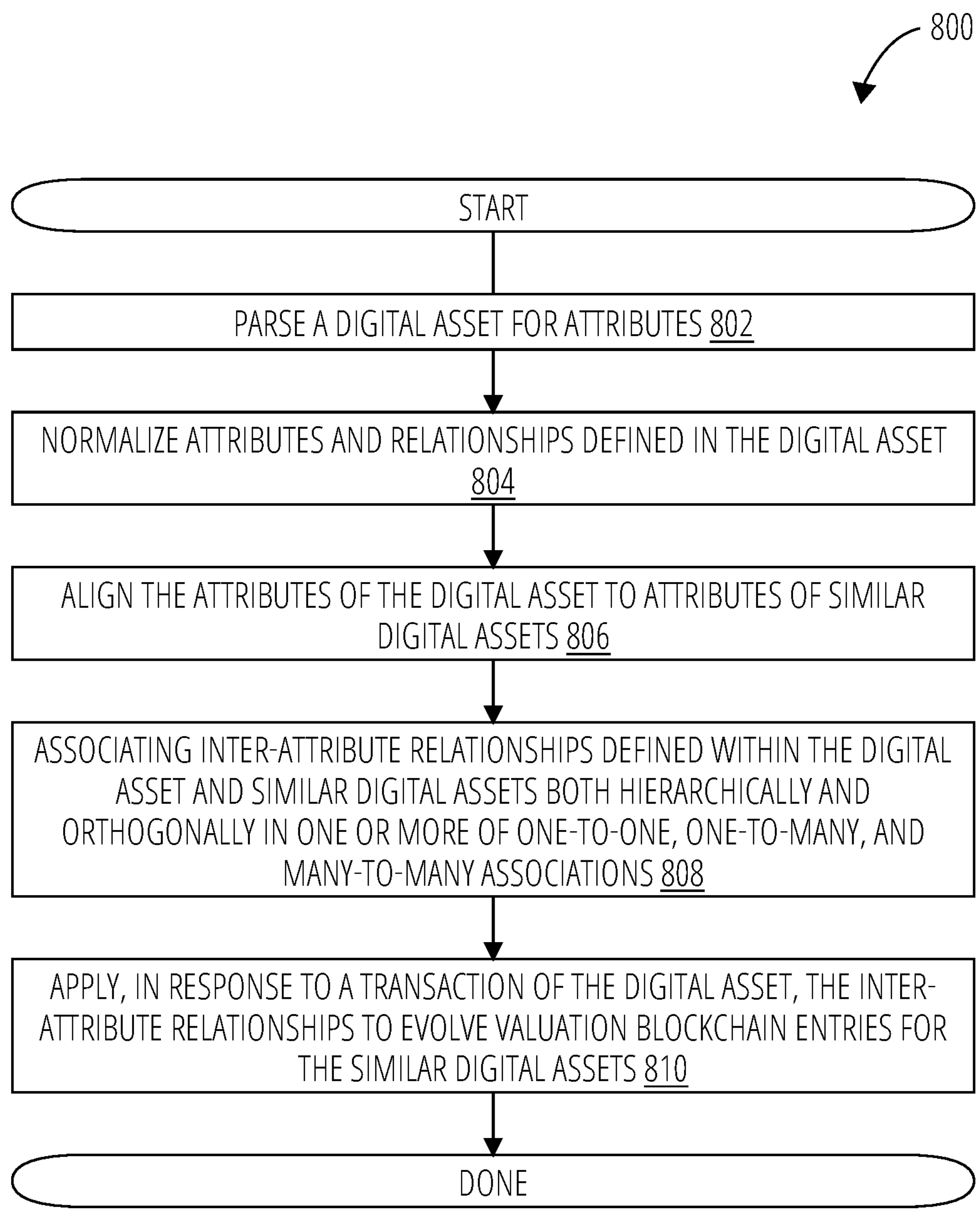
FIG. 8 depicts an asset re-valuation process 800 in accordance with one embodiment.

FIG. 8 depicts an asset re-valuation process 800 in one embodiment. In block 802, the asset re-valuation process 800 parses a digital asset for attributes. In block 804, the asset re-valuation process 800 normalizes attributes and relationships defined in the digital asset. In block 806, the asset re-valuation process 800 aligns the attributes of the digital asset to attributes of similar digital assets. In block 808, the asset re-valuation process 800 associates inter-attribute relationships defined within the digital asset and similar digital assets both hierarchically and orthogonally in one or more of one-to-one, one-to-many, and many-to-many associations. In block 810, the asset re-valuation process 800 applies, in response to a transaction of the digital asset, the inter-attribute relationships to evolve valuation blockchain entries (e.g., ERC 821 and ERC 165 NFT contract blocks) for the similar digital assets.

The systems disclosed herein, or particular components thereof, may in some embodiments be implemented as software comprising instructions executed on one or more programmable device. By way of example, components of the disclosed systems may be implemented as an application, an app, drivers, or services. In one particular embodiment, the system is implemented as a service that executes as one or more processes, modules, subroutines, or tasks on a server device so as to provide the described capabilities to one or more client devices over a network. However, the system need not necessarily be accessed over a network and could, in some embodiments, be implemented by one or more app or applications on a single device or distributed between a mobile device and a computer, for example.

For example one or more of the natural language processor 202, machine learning logic 204, machine natural language processor 202, ontology structure 212, and blockchain components previously described may implemented as software.

Figure 9:
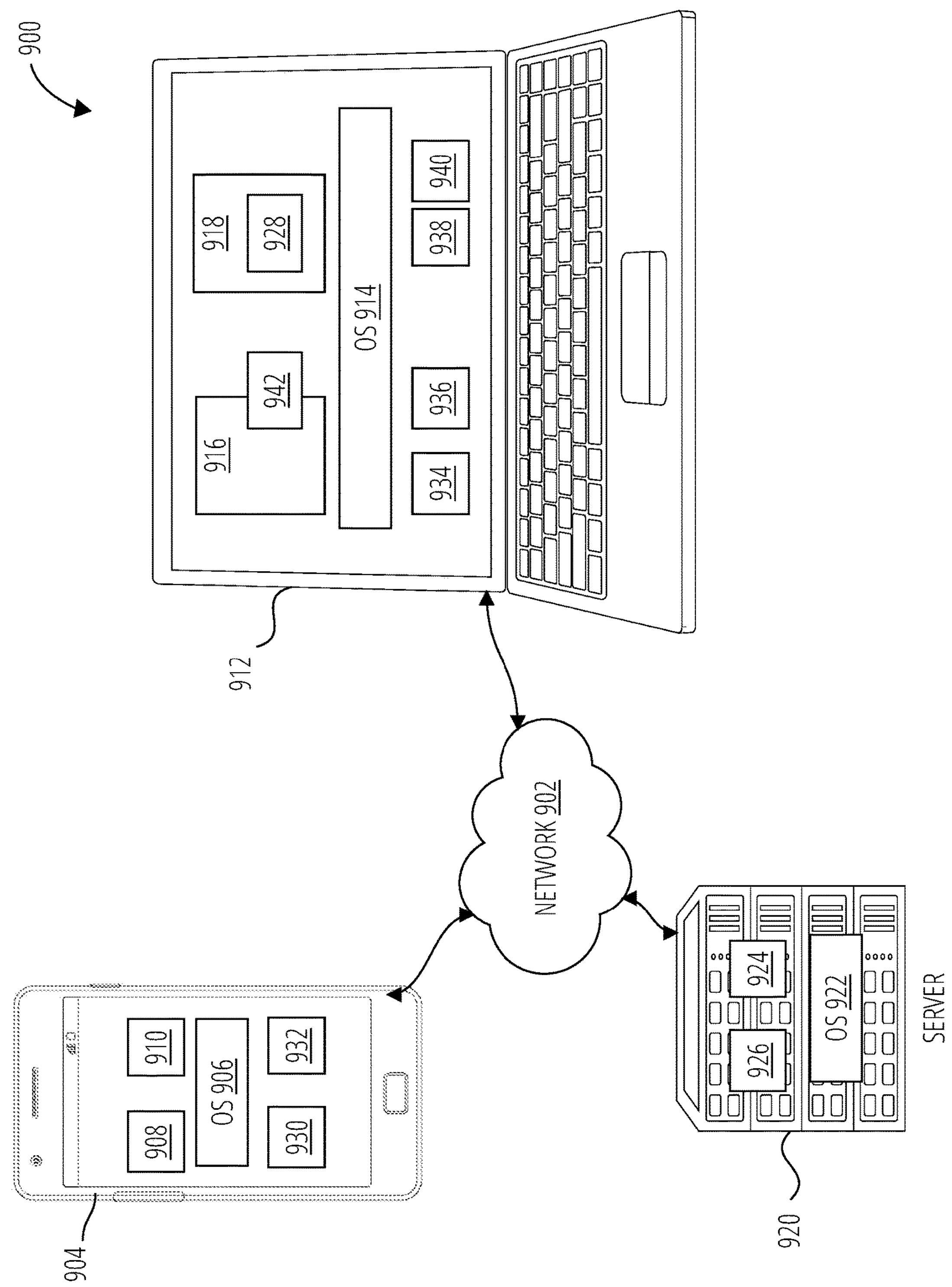
FIG. 9 depicts a client server network configuration 900 in accordance with one embodiment.

Referring to FIG. 9, a client server network configuration 900 depicts various computer hardware devices and software modules coupled by a network 902 in one embodiment. Each device includes a native operating system, typically pre-installed on its non-volatile RAM, and a variety of software applications or apps for performing various functions.

The mobile programmable device 904 comprises a native operating system 906 and various apps (e.g., app 908 and app 910). A computer 912 also includes an operating system 914 that may include one or more library of native routines to run executable software on that device. The computer 912 also includes various executable applications (e.g., application 916 and application 918). The mobile programmable device 904 and computer 912 are configured as clients on the network 902. A server 920 is also provided and includes an operating system 922 with native routines specific to providing a service (e.g., service 924 and service 926) available to the networked clients in this configuration.

As is well known in the art, an application, an app, or a service may be created by first writing computer code to form a computer program, which typically comprises one or more computer code sections or modules. Computer code may comprise instructions in many forms, including source code, assembly code, object code, executable code, and machine language. Computer programs often implement mathematical functions or algorithms and may implement or utilize one or more application program interfaces.

A compiler is typically used to transform source code into object code and thereafter a linker combines object code files into an executable application, recognized by those skilled in the art as an "executable". The distinct file comprising the executable would then be available for use by the computer 912, mobile programmable device 904, and/or server 920. Any of these devices may employ a loader to place the executable and any associated library in memory for execution. The operating system executes the program by passing control to the loaded program code, creating a task or process. An alternate means of executing an application or app involves the use of an interpreter (e.g., interpreter 928).

In addition to executing applications ("apps") and services, the operating system is also typically employed to execute drivers to perform common tasks such as connecting to third-party hardware devices (e.g., printers, displays, input devices), storing data, interpreting commands, and extending the capabilities of applications. For example, a driver 930 or driver 932 on the mobile programmable device 904 or computer 912 (e.g., driver 934 and driver 936) might enable wireless headphones to be used for audio output(s) and a camera to be used for video inputs. Any of the devices may read and write data from and to files (e.g., file 938 or file 940) and applications or apps may utilize one or more plug-in (e.g., plug-in 942) to extend their capabilities (e.g., to encode or decode video files).

The network 902 in the client server network configuration 900 can be of a type understood by those skilled in the art, including a Local Area Network (LAN), Wide Area Network (WAN), Transmission Communication Protocol/Internet Protocol (TCP/IP) network, and so forth. These protocols used by the network 902 dictate the mechanisms by which data is exchanged between devices.

Figure 10:
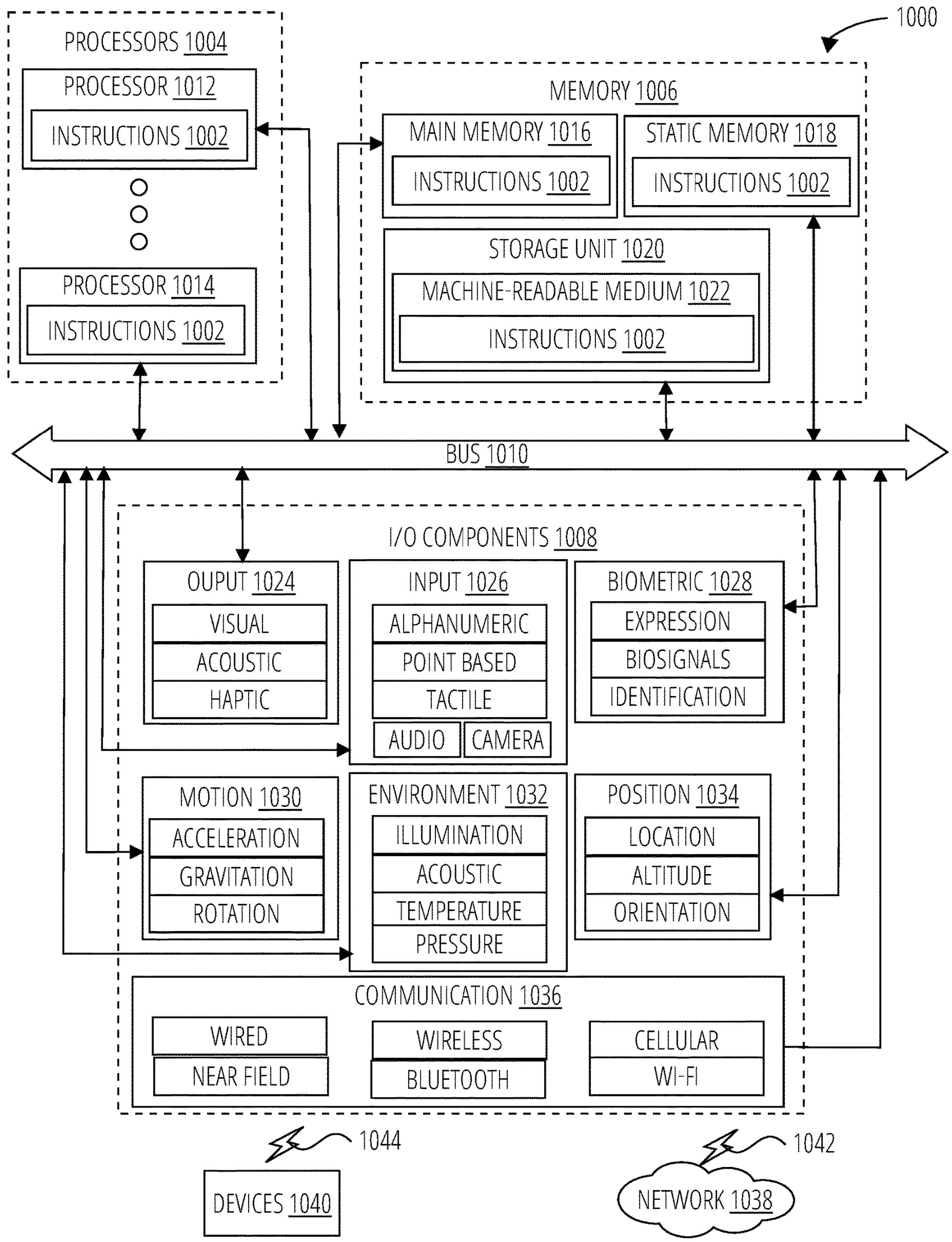
FIG. 10 depicts a machine 1000 in the form of a computer system within which a set of instructions may be executed for causing the machine to perform any one or more of the methodologies discussed herein, according to an example embodiment.

FIG. 10 depicts a diagrammatic representation of a machine 1000 in the form of a computer system within which logic may be implemented to cause the machine to perform any one or more of the functions or methods disclosed herein, according to an example embodiment.

Specifically, FIG. 10 depicts a machine 1000 comprising instructions 1002 (e.g., a program, an application, an applet, an app, or other executable code) for causing the machine 1000 to perform any one or more of the functions or methods discussed herein. For example the instructions 1002 may cause the machine 1000 to perform functions and methods of the routine 100, system 200, system 300, prior approval matching process 400, ECI lifecycle management process 500, DACBOT system 600, blockchain asset re-valuation process 700, and/or asset re-valuation process 800. The instructions 1002 configure a general, non-programmed machine into a particular machine 1000 programmed to carry out said functions and/or methods.

In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1002, sequentially or otherwise, that specify actions to be taken by the machine 1000. Further, while only a single machine 1000 is depicted, the term "machine" shall also be taken to include a collection of machines that individually or jointly execute the instructions 1002 to perform any one or more of the methodologies or subsets thereof discussed herein.

The machine 1000 may include processors 1004, memory 1006, and I/O components 1008, which may be configured to communicate with each other such as via one or more bus 1010. In an example embodiment, the processors 1004 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, one or more processor (e.g., processor 1012 and processor 1014) to execute the instructions 1002. The term "processor" is intended to include multi-core processors that may comprise two or more independent processors (sometimes referred to as "cores") that may execute instructions contemporaneously. Although FIG. 10 depicts multiple processors 1004, the machine 1000 may include a single processor with a single core, a single processor with multiple cores (e.g., a multi-core processor), multiple processors with a single core, multiple processors with multiples cores, or any combination thereof.

The memory 1006 may include one or more of a main memory 1016, a static memory 1018, and a storage unit 1020, each accessible to the processors 1004 such as via the bus 1010. The main memory 1016, the static memory 1018, and storage unit 1020 may be utilized, individually or in combination, to store the instructions 1002 embodying any one or more of the functionality described herein. The instructions 1002 may reside, completely or partially, within the main memory 1016, within the static memory 1018, within a machine-readable medium 1022 within the storage unit 1020, within at least one of the processors 1004 (e.g., within the processor's cache memory), or any suitable combination thereof, during execution thereof by the machine 1000.

The I/O components 1008 may include a wide variety of components to receive input, provide output, produce output, transmit information, exchange information, capture measurements, and so on. The specific I/O components 1008 that are included in a particular machine will depend on the type of machine. For example, portable machines such as mobile phones will likely include a touch input device or other such input mechanisms, while a headless server machine will likely not include such a touch input device. It will be appreciated that the I/O components 1008 may include many other components that are not shown in FIG. 10. The I/O components 1008 are grouped according to functionality merely for simplifying the following discussion and the grouping is in no way limiting. In various example embodiments, the I/O components 1008 may include output components 1024 and input components 1026. The output components 1024 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), one or more cameras for capturing still images and video, and the like.

In further example embodiments, the I/O components 1008 may include biometric components 1028, motion components 1030, environmental components 1032, or position components 1034, among a wide array of possibilities. For example, the biometric components 1028 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 may include acceleration sensor components (e.g., accelerometer), gravitation sensor components, rotation sensor components (e.g., gyroscope), and so forth. The environmental components 1032 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1034 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1008 may include communication components 1036 operable to couple the machine 1000 to a network 1038 or devices 1040 via a coupling 1042 and a coupling 1044, respectively. For example, the communication components 1036 may include a network interface component or another suitable device to interface with the network 1038. In further examples, the communication components 1036 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1040 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (i.e., memory 1006, main memory 1016, static memory 1018, and/or memory of the processors 1004) and/or storage unit 1020 may store one or more sets of instructions and data structures (e.g., software) embodying or utilized by any one or more of the methodologies or functions described herein. These instructions (e.g., the instructions 1002), when executed by processors 1004, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors and internal or external to computer systems. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such intangible media, at least some of which are covered under the term "signal medium" discussed below.

Some aspects of the described subject matter may in some embodiments be implemented as computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular data structures in memory. The subject matter of this application may be practiced in a variety of system configurations, including hand-held devices, consumer electronics, general-purpose computers, more specialty computing devices, etc. The subject matter may also be practiced in distributed computing environments where tasks are performed by remote-processing devices that are linked through a communications network.

In various example embodiments, one or more portions of the network 1038 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1038 or a portion of the network 1038 may include a wireless or cellular network, and the coupling 1042 may be a Code Division Multiple Access (CDMA) connection, a Global System for Mobile communications (GSM) connection, or another type of cellular or wireless coupling. In this example, the coupling 1042 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1002 and/or data generated by or received and processed by the instructions 1002 may be transmitted or received over the network 1038 using a transmission medium via a network interface device (e.g., a network interface component included in the communication components 1036) and utilizing any one of a number of well-known transfer protocols (e.g., hypertext transfer protocol (HTTP)). Similarly, the instructions 1002 may be transmitted or received using a transmission medium via the coupling 1044 (e.g., a peer-to-peer coupling) to the devices 1040. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1002 for execution by the machine 1000, and/or data generated by execution of the instructions 1002, and/or data to be operated on during execution of the instructions 1002, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

LISTING OF DRAWING ELEMENTS

100 routine
102 block
104 block
106 block
108 block
110 block
112 block
114 block
200 system
202 natural language processor
204 machine learning logic
206 blockchain
208 distributed computer systems
210 documents
212 ontology structure
300 system
302 DDTC
304 licensee
306 sub-licensee
308 REIN-IN
310 Trade Authorization
312 PDF
314 smart contract
316 DDTC blockchain
318 licensee blockchain
320 nodes
322 node
324 node
326 sub-licensee blockchain
328 reporting tool
400 prior approval matching process
402 business transaction
404 transaction attributes
406 objects involved
408 entities involved
410 individuals involved
412 prior approval match
414 record-keeping
416 reporting
418 transactional control trigger point
420 object attributes
422 entity attributes
424 individual attributes
426 transactional attributes
428 automated trade control term ontology repository
430 ECI=Y/N
432 jurisdiction
434 classification
436 name
438 address
440 country
442 employer
444 name
446 address
448 country
450 126.18 attributes
452 nationality
454 object attributes
456 entity attributes
458 individual attributes
460 trade authorization
462 jurisdiction
464 classification
466 name
468 address
470 country
472 country
474 126.18 attributes
476 nationality
478 employer
480 name 482 address
500 ECI lifecycle management process
502 receiving block
504 customers
506 suppliers
508 creation block
510 storage block
512 management block
514 collaboration block
516 transmission block
518 customers
520 suppliers
522 back-up/archival block
524 JC capabilities overlay
526 location control
528 access control
530 transfer control
532 visibility control
600 DACBOT system
602 digital asset
604 attributes
606 attribute scanner
608 TABEE logic
610 business contracts
612 computer system crawler
614 DACBOT
616 analytics interface
618 asset associator
620 database
622 similar digital assets
624 attribute aligner
626 blockchain
628 secure metalayer
630 ERC721/ERC821 chain
700 blockchain asset re-valuation process
702 asset attributes
704 user
706 sells an asset
708 sales record
710 asset attributes and relationships
712 normalizer
714 normalized attributes
716 associates and aligns the normalized attributes with attributes of other assets
718 value adjustments to similar assets
800 asset re-valuation process
802 block
804 block
806 block
808 block
810 block
900 client server network configuration
902 network
904 mobile programmable device
906 operating system
908 app
910 app
912 computer
914 operating system
916 application
918 application
920 server
922 operating system
924 service
926 service
928 interpreter
930 driver
932 driver
934 driver
936 driver
938 file
940 file
942 plug-in
1000 machine
1002 instructions
1004 processors
1006 memory
1008 I/O components
1010 bus
1012 processor
1014 processor
1016 main memory
1018 static memory
1020 storage unit
1022 machine-readable medium
1024 output components
1026 input components
1028 biometric components
1030 motion components
1032 environmental components
1034 position components
1036 communication components
1038 network
1040 devices
1042 coupling
1044 coupling

LISTING OF DRAWING ELEMENTS 100 routine
102 block
104 block
106 block
108 block
110 block
112 block
114 block
200 system
202 natural language processor
204 machine learning logic
206 blockchain
208 distributed computer systems
210 documents
212 ontology structure
300 system
302 DDTC
304 licensee
306 sub-licensee
308 REIN-IN
310 Trade Authorization
312 PDF
314 smart contract
316 DDTC blockchain
318 licensee blockchain
320 nodes
322 node
324 node
326 sub-licensee blockchain
328 reporting tool
400 prior approval matching process
402 business transaction
404 transaction attributes
406 objects involved
408 entities involved

410 individuals involved
412 prior approval match
414 record-keeping
416 reporting
418 transactional control trigger point
420 object attributes
422 entity attributes
424 individual attributes
426 transactional attributes
428 automated trade control term ontology repository
430 ECI=Y/N
432 jurisdiction
434 classification
436 name
438 address
440 country
442 employer
444 name
446 address
448 country
450 126.18 attributes
452 nationality
454 object attributes
456 entity attributes
458 individual attributes
460 trade authorization
462 jurisdiction
464 classification
466 name
468 address
470 country
472 country
474 126.18 attributes
476 nationality
478 employer
480 name
482 address
500 ECI lifecycle management process
502 receiving block
504 customers
506 suppliers
508 creation block
510 storage block
512 management block
514 collaboration block
516 transmission block
518 customers
520 suppliers
522 back-up/archival block
524 JC capabilities overlay
526 location control
528 access control
530 transfer control
532 visibility control
600 DACBOT system
602 digital asset
604 attributes
606 attribute scanner
608 TABEE logic
610 business contracts
612 computer system crawler
614 DACBOT
616 analytics interface
618 asset associator
620 database
622 similar digital assets
624 attribute aligner
626 blockchain
628 secure metalayer
630 ERC721/ERC821 chain
700 blockchain asset re-valuation process
702 asset attributes
704 user
706 sells an asset
708 sales record
710 asset attributes and relationships
712 normalizer
714 normalized attributes
716 associates and aligns the normalized attributes with attributes of other assets
718 value adjustments to similar assets
800 asset re-valuation process
802 block
804 block
806 block
808 block
810 block
900 client server network configuration
902 network
904 mobile programmable device
906 operating system
908 app
910 app
912 computer
914 operating system
916 application
918 application
920 server
922 operating system
924 service
926 service
928 interpreter
930 driver
932 driver
934 driver
936 driver
938 file
940 file
942 plug-in
1000 machine
1002 instructions
1004 processors
1006 memory
1008 I/O components
1010 bus
1012 processor
1014 processor
1016 main memory
1018 static memory
1020 storage unit
1022 machine-readable medium
1024 output components
1026 input components
1028 biometric components
1030 motion components
1032 environmental components
1034 position components
1036 communication components
1038 network
1040 devices
1042 coupling
1044 coupling Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A system for operating digital gates to control movement of an item between a plurality of computer systems from a central, secure location, the system comprising:

a first computer system to receive a digital file;

a natural language processing system configured to:

map attributes, control terms, and inter-attribute relationships encoded in the digital file to synonyms in a repository, the mapping prioritized based on a particular source from which the terms are derived;

apply the synonyms to generate digital gate controls common to the digital file and to digital files previously received by the system;

encode the digital gate controls on a primary control blockchain;

identify from the digital file a hierarchy of entities involved in moving the item across a geographic boundary;

for each particular entity that is identified as being involved in moving the item, encoding, on a secondary control blockchain for the particular entity, the inter-attribute relationships as conditions for operating the digital gate controls;

logic to recursively apply the encodings from the secondary control blockchains to the encodings on the primary control blockchain to enable or inhibit the digital gates to control, from the central, secure location, movement of the item between the plurality of computer systems; and whereby the digital file is input to only the first computer system and is not communicated to others of the plurality of computer systems.

2. The system of claim 1, further comprising logic to:

align the attributes of the item to attributes of similar items on the one or more valuation blockchain; and apply the inter-attribute relationships, in response to a transaction of the item, to evolve entries for the similar items on the one or more valuation blockchains.

3. The system of claim 2, wherein the similar items satisfy a configured metric of similarity with the item.

4. The system of claim 1, wherein the repository is structured as an ontology.

* * * * *